US008799218B2

(12) United States Patent
Liu et al.

(10) Patent No.: US 8,799,218 B2
(45) Date of Patent: Aug. 5, 2014

(54) BUSINESS CHANNEL SYNCHRONIZATION

(75) Inventors: Allen Yihren Liu, San Francisco, CA (US); Philip J. King, San Mateo, CA (US); Michael Maffeo, San Jose, CA (US); Hemant V. Tamhanker, Milpitas, CA (US); Ajay K. Agrawal, Cupertino, CA (US)

(73) Assignee: eBay Inc., San Jose, CA (US)

(*) Notice: Subject to any disclaimer, the term of this patent is extended or adjusted under 35 U.S.C. 154(b) by 466 days.

(21) Appl. No.: 11/566,117

(22) Filed: Dec. 1, 2006

(65) Prior Publication Data
US 2008/0133612 A1    Jun. 5, 2008

(51) Int. Cl.
*G06F 17/30* (2006.01)
*G06Q 10/10* (2012.01)

(52) U.S. Cl.
CPC ........................... *G06Q 10/10* (2013.01)
USPC .......... 707/617; 705/26.3; 707/610; 707/618; 707/620

(58) Field of Classification Search
USPC ................. 707/200, 610, 782, 617, 618, 620; 705/26.3
See application file for complete search history.

(56) References Cited

U.S. PATENT DOCUMENTS

| | | | |
|---|---|---|---|
| 3,573,747 A | 4/1971 | Adams et al. |
| 3,581,072 A | 5/1971 | Nymeyer |
| 4,412,287 A | 10/1983 | Braddock, III |
| 4,674,044 A | 6/1987 | Kalmus et al. |
| 4,677,552 A | 6/1987 | Sibley, Jr. |
| 4,789,928 A | 12/1988 | Fujisaki |
| 4,799,156 A | 1/1989 | Shavit et al. |
| 4,823,265 A | 4/1989 | Nelson |
| 4,864,516 A | 9/1989 | Gaither et al. |
| 4,903,201 A | 2/1990 | Wagner |
| 5,063,507 A | 11/1991 | Lindsey et al. |
| 5,077,665 A | 12/1991 | Silverman et al. |

(Continued)

FOREIGN PATENT DOCUMENTS

| CA | 2253543 A1 | 3/1997 |
|---|---|---|
| CN | 102129642 A | 7/2011 |

(Continued)

OTHER PUBLICATIONS

Article entitled "Ebay Blackthorne: The official Guide" by Blackthorne, publically available in the United States on Oct. 20, 2005.*

(Continued)

*Primary Examiner* — Mahesh Dwivedi
(74) *Attorney, Agent, or Firm* — Schwegman Lundberg Woessner, P.A.

(57) ABSTRACT

A method and a system of business channel synchronization are provided. In one example embodiment, a network-based commerce system may receive, via a network and from a client application, update data related to a user listing, update a record related to the user listing, utilizing the received update data; and communicate, via the network, the received update data reflecting a further update to the record related to the user listing to the client application. In one example embodiment, a client system may comprise a communication module, a listing manager, a synchronization engine, an upload module, and a user interface module. In one example embodiment, a user may synchronize the user's listing data from a client application to one or more network-based commerce systems. In an alternative example embodiment the user may synchronize the user's listing data from one or more network-based commerce systems to a client application.

28 Claims, 18 Drawing Sheets

(56) References Cited

U.S. PATENT DOCUMENTS

| | | |
|---|---|---|
| 5,101,353 A | 3/1992 | Lupien et al. |
| 5,136,501 A | 8/1992 | Silverman et al. |
| 5,168,446 A | 12/1992 | Wiseman |
| 5,205,200 A | 4/1993 | Wright |
| 5,243,515 A | 9/1993 | Lee |
| 5,258,908 A | 11/1993 | Hartheimer et al. |
| 5,280,422 A | 1/1994 | Moe et al. |
| 5,297,031 A | 3/1994 | Gutterman et al. |
| 5,297,032 A | 3/1994 | Trojan et al. |
| 5,305,200 A | 4/1994 | Hartheimer et al. |
| 5,325,297 A | 6/1994 | Bird et al. |
| 5,329,589 A | 7/1994 | Fraser et al. |
| 5,375,055 A | 12/1994 | Togher et al. |
| 5,394,324 A | 2/1995 | Clearwater |
| 5,426,281 A | 6/1995 | Abecassis |
| 5,485,510 A | 1/1996 | Colbert |
| 5,553,145 A | 9/1996 | Micali |
| 5,557,728 A | 9/1996 | Garrett et al. |
| 5,596,994 A | 1/1997 | Bro |
| 5,598,557 A | 1/1997 | Doner et al. |
| 5,640,569 A | 6/1997 | Miller et al. |
| 5,657,389 A | 8/1997 | Houvener |
| 5,664,115 A | 9/1997 | Fraser |
| 5,689,652 A | 11/1997 | Lupien et al. |
| 5,694,546 A | 12/1997 | Reisman |
| 5,706,457 A | 1/1998 | Dwyer et al. |
| 5,710,889 A | 1/1998 | Clark et al. |
| 5,715,314 A | 2/1998 | Payne et al. |
| 5,715,402 A | 2/1998 | Popolo |
| 5,717,989 A | 2/1998 | Tozzoli et al. |
| 5,722,418 A | 3/1998 | Bro |
| 5,724,524 A | 3/1998 | Hunt et al. |
| 5,727,165 A | 3/1998 | Ordish et al. |
| 5,771,291 A | 6/1998 | Newton et al. |
| 5,771,380 A | 6/1998 | Tanaka et al. |
| 5,790,790 A | 8/1998 | Smith et al. |
| 5,794,219 A | 8/1998 | Brown |
| 5,799,285 A | 8/1998 | Klingman |
| 5,803,500 A | 9/1998 | Mossberg |
| 5,818,914 A | 10/1998 | Fujisaki |
| 5,826,244 A | 10/1998 | Huberman |
| 5,835,896 A | 11/1998 | Fisher et al. |
| 5,845,265 A | 12/1998 | Woolston |
| 5,845,266 A | 12/1998 | Lupien et al. |
| 5,850,442 A | 12/1998 | Muftic |
| 5,857,188 A | 1/1999 | Douglas |
| 5,857,201 A | 1/1999 | Wright et al. |
| 5,857,203 A | 1/1999 | Kauffman et al. |
| 5,872,848 A | 2/1999 | Romney et al. |
| 5,873,069 A | 2/1999 | Reuhl et al. |
| 5,884,056 A | 3/1999 | Steele |
| 5,890,138 A | 3/1999 | Godin et al. |
| 5,905,974 A | 5/1999 | Fraser et al. |
| 5,905,975 A | 5/1999 | Ausubel |
| 5,909,544 A | 6/1999 | Anderson et al. |
| 5,922,074 A | 7/1999 | Richard et al. |
| 5,924,072 A | 7/1999 | Havens |
| 5,926,794 A | 7/1999 | Fethe |
| 5,944,790 A | 8/1999 | Levy |
| 5,974,412 A | 10/1999 | Hazlehurst et al. |
| 5,991,739 A | 11/1999 | Cupps et al. |
| 6,035,288 A | 3/2000 | Solomon |
| 6,035,402 A | 3/2000 | Vaeth et al. |
| 6,044,363 A | 3/2000 | Mori et al. |
| 6,047,264 A | 4/2000 | Fisher et al. |
| 6,055,518 A | 4/2000 | Franklin et al. |
| 6,058,379 A | 5/2000 | Odom et al. |
| 6,058,417 A | 5/2000 | Hess et al. |
| 6,073,117 A | 6/2000 | Oyanagi et al. |
| 6,085,176 A | 7/2000 | Woolston |
| 6,104,815 A | 8/2000 | Alcorn et al. |
| 6,119,137 A | 9/2000 | Smith et al. |
| 6,119,229 A | 9/2000 | Martinez et al. |
| 6,151,589 A | 11/2000 | Aggarwal et al. |
| 6,161,082 A | 12/2000 | Goldberg et al. |
| 6,178,408 B1 | 1/2001 | Copple et al. |
| 6,192,407 B1 | 2/2001 | Smith et al. |
| 6,202,051 B1 | 3/2001 | Woolston |
| 6,243,691 B1 | 6/2001 | Fisher et al. |
| 6,266,651 B1 | 7/2001 | Woolston |
| 6,266,652 B1 | 7/2001 | Godin et al. |
| 6,272,675 B1 | 8/2001 | Schrab et al. |
| 6,415,270 B1 | 7/2002 | Rackson et al. |
| 6,574,239 B1 | 6/2003 | Dowling et al. |
| 6,598,026 B1 | 7/2003 | Ojha et al. |
| 6,965,882 B1 | 11/2005 | Lapstun et al. |
| 7,080,104 B2 * | 7/2006 | Ring et al. .................... 1/1 |
| 7,251,612 B1 | 7/2007 | Parker et al. |
| 7,895,082 B2 | 2/2011 | Veres et al. |
| 7,941,348 B2 | 5/2011 | Veres et al. |
| 8,255,286 B2 | 8/2012 | Veres et al. |
| 8,442,871 B2 | 5/2013 | Veres et al. |
| 8,719,041 B2 | 5/2014 | Veres et al. |
| 8,732,037 B2 | 5/2014 | Boone et al. |
| 2001/0029455 A1 | 10/2001 | Chin et al. |
| 2001/0039524 A1 * | 11/2001 | Harrison et al. ............. 705/35 |
| 2001/0039531 A1 | 11/2001 | Aoki |
| 2001/0049707 A1 | 12/2001 | Tran |
| 2002/0029182 A1 | 3/2002 | Nakagawa |
| 2002/0082977 A1 | 6/2002 | Hammond et al. |
| 2002/0123959 A1 | 9/2002 | Mozley et al. |
| 2003/0018885 A1 | 1/2003 | Landsman et al. |
| 2003/0061306 A1 * | 3/2003 | Kanno et al. ................. 709/217 |
| 2003/0084051 A1 | 5/2003 | Depura et al. |
| 2003/0093326 A1 | 5/2003 | Poon et al. |
| 2003/0110047 A1 | 6/2003 | Santosuosso |
| 2003/0229544 A1 * | 12/2003 | Veres et al. .................. 705/26 |
| 2003/0229545 A1 | 12/2003 | Veres et al. |
| 2003/0229554 A1 | 12/2003 | Veres et al. |
| 2004/0073507 A1 | 4/2004 | Scott et al. |
| 2004/0078297 A1 | 4/2004 | Veres et al. |
| 2004/0128224 A1 * | 7/2004 | Dabney et al. ............... 705/37 |
| 2004/0254853 A1 * | 12/2004 | Heene et al. ................. 705/26 |
| 2005/0033655 A1 * | 2/2005 | Woolston ...................... 705/26 |
| 2005/0102328 A1 * | 5/2005 | Ring et al. .................... 707/201 |
| 2005/0203673 A1 * | 9/2005 | El-Hajj et al. ................ 701/1 |
| 2006/0047824 A1 * | 3/2006 | Bowler ......................... 709/229 |
| 2006/0059246 A1 * | 3/2006 | Grove ........................... 709/219 |
| 2006/0074792 A1 | 4/2006 | Wagoner et al. |
| 2007/0112643 A1 | 5/2007 | Veres et al. |
| 2008/0043774 A1 * | 2/2008 | Achtermann et al. ........ 370/464 |
| 2011/0231530 A1 | 9/2011 | Veres et al. |
| 2012/0246233 A1 | 9/2012 | Veres et al. |

FOREIGN PATENT DOCUMENTS

| | | | |
|---|---|---|---|
| FR | 2658635 A1 | 8/1991 | |
| JP | 2001000469 A | 1/2001 | |
| JP | 2004094643 A | 3/2004 | |
| KR | 20000018041 A | 4/2000 | |
| KR | 20000024372 A | 5/2000 | |
| KR | 20000049744 A | 8/2000 | |
| KR | 20020059971 A | 7/2002 | |
| KR | 20000037395 A | 4/2008 | |
| NL | 9300266 A | 9/1994 | |
| WO | WO-9215174 A1 | 9/1992 | |
| WO | WO-9517711 A1 | 6/1995 | |
| WO | WO-9634356 A1 | 10/1996 | |
| WO | WO-9737315 A1 | 10/1997 | |
| WO | WO-9963461 A1 | 12/1999 | |
| WO | WO-0058862 A2 | 10/2000 | |
| WO | WO-0102926 A2 | 1/2001 | |
| WO | WO-0182115 A1 | 11/2001 | |
| WO | WO-03038560 A2 | 5/2003 | |
| WO | WO-03104931 A3 | 12/2003 | |

OTHER PUBLICATIONS

Article entitled "eBay Blackthorne" by Nino, published on Oct. 10, 2005.*

"U.S. Appl. No. 10/252,126, Appeal Brief filed Feb. 4, 2009", 22 pgs.

"U.S. Appl. No. 10/252,126, Decision on Appeal mailed Sep. 15, 2010", 8 pgs.

(56) References Cited

OTHER PUBLICATIONS

"U.S. Appl. No. 10/252,126, Examiner Interview Summary mailed Oct. 26, 2007", 1 pg.
"U.S. Appl. No. 10/252,126, Examiner's Answer to Appeal Brief mailed Apr. 29, 2009", 12 pgs.
"U.S. Appl. No. 10/252,126, Final Office Action mailed Feb. 26, 2008", 12 pgs.
"U.S. Appl. No. 10/252,126, Final Office Action mailed Jun. 27, 2006", 11 pgs.
"U.S. Appl. No. 10/252,126, Final Office Action mailed Sep. 4, 2008", 13 pgs.
"U.S. Appl. No. 10/252,126, Non Final Office Action mailed Jan. 30, 2007", 9 pgs.
"U.S. Appl. No. 10/252,126, Non Final Office Action mailed Feb. 3, 2006", 8 pgs.
"U.S. Appl. No. 10/252,126, Non Final Office Action mailed Aug. 20, 2007", 8 pgs.
"U.S. Appl. No. 10/252,126, Notice of Allowance mailed Dec. 30, 2010", 13 pgs.
"U.S. Appl. No. 10/252,126, Response filed May 3, 2006 to Non Final Office Action mailed Feb. 3, 2006", 7 pgs.
"U.S. Appl. No. 10/252,126, Response filed Jun. 25, 2007 to Non Final Office Action mailed Jan. 30, 2007", 11 pgs.
"U.S. Appl. No. 10/252,126, Response filed Jul. 28, 2008 to Final Office Action mailed Feb. 26, 2008", 7 pgs.
"U.S. Appl. No. 10/252,126, Response filed Oct. 27, 2006 to Final Office Action mailed Jun. 27, 2006", 8 pgs.
"U.S. Appl. No. 10/252,126, Response filed Dec. 20, 2007 to Non-Final Office Action mailed Aug. 20, 2007", 8 pgs.
"U.S. Appl. No. 10/252,126, Response filed Dec. 29, 2005 to Restriction Requirement mailed Oct. 31, 2005", 5 pgs.
"U.S. Appl. No. 10/252,126, Restriction Requirement mailed Oct. 31, 2005", 7 pgs.
"U.S. Appl. No. 11/647,728, Examiner Interview Summary mailed Aug. 11, 2010", 3 pgs.
"U.S. Appl. No. 11/647,728, Final Office Action mailed Jul. 13, 2010", 17 pgs.
"U.S. Appl. No. 11/647,728, Non-Final Office Action mailed Mar. 8, 2010", 18 pgs.
"U.S. Appl. No. 11/647,728, Notice of Allowance mailed Oct. 19, 2010", 11 pgs.
"U.S. Appl. No. 11/647,728, Response filed Jun. 8, 2010 to Non Final Office Action mailed Mar. 8, 2010", 13 pgs.
"U.S. Appl. No. 11/647,728, Response filed Sep. 22, 2010 to Final Office Action mailed Jul. 13, 2010", 14 pgs.
"U.S. Appl. No. 13/080,426, Non Final Office Action mailed Oct. 31, 2011", 8 pgs.
"U.S. Appl. No. 13/080,426, Notice of Allowance mailed Jan. 26, 2012", 7 pgs.
"U.S. Appl. No. 13/080,426, Notice of Allowance mailed Apr. 23, 2012", 7 pgs.
"U.S. Appl. No. 13/080,426, Response filed Dec. 18, 2011 to Non Final Office Action mailed Oct. 31, 2011", 9 pgs.
"U.S. Appl. No. 13/489,646, 312 Amendment filed Mar. 7, 2013", 4 pgs.
"U.S. Appl. No. 13/489,646, Non Final Office Action mailed Sep. 19, 2012", 8 pgs.
"U.S. Appl. No. 13/489,646, Notice of Allowance mailed Jan. 10, 2013", 7 pgs.
"U.S. Appl. No. 13/489,646, PTO Response to 312 Amendment mailed Mar. 14, 2013", 2 pgs.
"U.S. Appl. No. 13/489,646, Response filed Dec. 3, 2012 to Non Final Office Action mailed Sep. 19, 2012", 11 pgs.
"Auction Watch: Buyer and Seller Services", [Online]. Retrieved from the Internet: <URL: http://web.archive.org/web/20000830150100/http://www.auctionwatch.com>, (Aug. 15, 2000), 30 pgs.
"Auctionwatch", [Online]. Retrieved from the Internet: <URL: http://web.archive.org/web/20000830150100/http://www.auctionwatch.com>, (Aug. 15, 2008), 46 pgs.
"Blackthorne Products Page", [Online]. Retrieved from the Internet: <URL: http://web.archive.org/web/19990508065201/www.blackthornesw.com/Bthome/products>, (1999), 2 pgs, May 8, 1999.
"Chinese Application Serial No. 03813485.3, Office Action Mailed Jan. 9, 2009", with English translation of claims, 9 pgs.
"Chinese Application Serial No. 03813485.3, Office Action Mailed Jun. 24, 2010", with English translation of claims, 9 pgs.
"Chinese Application Serial No. 03813485.3, Office Action mailed Sep. 25, 2009", with English translation of claims, 15 pgs.
"Chinese Application Serial No. 03813485.3, Re-examination Decision mailed Nov. 29, 2010", with English translation of claims, 18 pgs.
"Chinese Application Serial No. 03813485.3, Response filed May 25, 2009 to Office Action mailed Jan. 9, 2009", with English translation of claims, 9 pgs.
"Chinese Application Serial No. 03813485.3, Response to Notification of Reexamination Filed: Aug. 9, 2010", with English translation of claims, 23 pgs.
"Chinese Application Serial No. 201110049654.X—Rejection Decison mailed Nov. 5, 2012", with English translation of claims, 16 pgs.
"Chinese Application Serial No. 201110049654.X, Office Action mailed Jan. 5, 2012", With English Translation, 10 pgs.
"Chinese Application Serial No. 201110049654.X, Office Action mailed Jul. 11, 2012", with English translation of claims, 10 pgs.
"Chinese Application Serial No. 201110049654.X, Response filed May 21, 2012 to Office Action mailed Jan. 5, 2012", with English translation of claims, 13 pgs.
"Chinese Application Serial No. 201110049654.X, Response filed Sep. 26, 2012 to Office Action mailed Jul. 11, 2012", 3 pgs.
"European Application Serial No. 03757395.3, Office Action mailed Oct. 8, 2010", 3 pgs.
"European Application Serial No. 03757395.3, Office Action mailed Dec. 8, 2005", 1 pg.
"European Application Serial No. 03757395.3, Office Action mailed Dec. 17, 2007", 21 pgs.
"European Application Serial No. 03757395.3, Office Action Response filed Apr. 18, 2011", 9 pgs.
"European Application Serial No. 03757395.3, Response filed Feb. 3, 2005 to Office Action mailed Dec. 17, 2004", 6 pgs.
"European Application Serial No. 03757395.3, Response filed Apr. 10, 2012 to Summons to Attend Oral Proceedings mailed Feb. 13, 2012", 20 pgs.
"European Application Serial No. 03757395.3, Search Report mailed Sep. 4, 2009", 2 pgs.
"European Application Serial No. 03757395.3, Summons to Attend Oral Proceedings mailed Feb. 13, 2012", 5 pgs.
"Frequently Asked Questions about Mister Lister", [Online]. Retrieved from the Internet: <URL: http://pages.ebay.co.uk/help/sellerguide/mr-lister-faq.html>, (Copyright 1995-2005), 5 pgs.
"Hello direct store joins eBay network of merchants", PR Newswire, New York, NY, (May 23, 2002), 2 pgs.
"Indian Application Serial No. 1921/KOLNP/2004, Decision to Grant mailed Nov. 18, 2009", 2 pgs.
"Indian Application Serial No. 1921/KOLNP/2004, First Examination Report mailed Apr. 7, 2008", 11 pgs.
"Indian Application Serial No. 1921/KOLNP/2004, Response filed Mar. 6, 2009 to Examiners First Report mailed Apr. 7, 2008", 13 pgs.
"International Application Serial No. PCT/US00/32088, International Search Report mailed Apr. 4, 2001", 6 pgs.
"International Application Serial No. PCT/US01/02584, International Search Report mailed Apr. 16, 2001", 4 pgs.
"International Application Serial No. PCT/US01/04811, International Search Report mailed Jun. 28, 2001", 6 pgs.
"International Application Serial No. PCT/US01/23854, International Search Report mailed Dec. 28, 2001", 6 pgs.
"International Application Serial No. PCT/US02/04692, International Search Report mailed Jun. 12, 2002", 5 pgs.
"International Application Serial No. PCT/US03/17915, Article 34 Amendment filed Dec. 17, 2003", 5 pgs.
"International Application Serial No. PCT/US03/17915, International Preliminary Examination Report mailed Mar. 26, 2004", 10 pgs.

(56) References Cited

OTHER PUBLICATIONS

"International Application Serial No. PCT/US03/17915, International Search Report mailed Nov. 26, 2003", 6 pgs.

"International Application Serial No. PCT/US99/18510, International Search Report mailed Oct. 29, 1999", 4 pgs.

"International Application Serial No. PCT/US99/29312, International Search Report mailed Apr. 18, 2000", 6 pgs.

"Korean Application Serial No. 2004-702020, Notice of Decision to Grant mailed Feb. 11, 2010", with English translation of claims, 3 pgs.

"Korean Application Serial No. 2004-702020, Response filed Jun. 30, 2009 to Office Action mailed Apr. 30, 2009", with English translation of claims, 43 pgs.

"Korean Application Serial No. 2004-702020, Response filed Dec. 24, 2009 to Final Office Action mailed Nov. 24, 2009", with English translation of claims, 36 pgs.

"Korean Application Serial No. 2004-7020202, Final Office Action mailed Nov. 24, 2009", with English translation of claims, 6 pgs.

"Korean Application Serial No. 2004-7020202, Office Action mailed Apr. 30, 2009", with English translation of claims, 6 pgs.

"Korean Application Serial No. 2004-7020202, Office Action mailed Aug. 29, 2008", with English translation of claims, 17 pgs.

"Korean Application Serial No. 2004-7020202, Preliminary Rejection mailed Nov. 30, 2007", with English translation of claims, 19 pgs.

"Korean Application Serial No. 2004-7020202, Response filed Apr. 30, 2008", with English translation of claims, 75 pgs.

"Korean Application Serial No. 2004-7020202, Response filed Dec. 29, 2008", with English translation of claims, 68 pgs.

"Korean Application Serial No. 2009-7027103, Final Office Action mailed Sep. 28, 2010", with English translation of claims, 5 Pgs.

"Korean Application Serial No. 2009-7027103, Notice of Decision to Grant mailed Feb. 14, 2011", with English translation of claims, 2 pgs.

"Korean Application Serial No. 2009-7027103, Office Action mailed, Mar. 26, 2010", with English translation of claims, 9 pgs.

"Korean Application Serial No. 2009-7027103, Response filed May 26, 2010 to Office Action mailed Mar. 26, 2010", with English translation of claims, 29 pgs.

"Korean Divisional Application Serial No. 2009-7027103, Appeal Filed Dec. 29, 2010 to Final Office Action mailed Sep. 28, 2010", with English translation of claims, 42 pgs.

"Thin Client", (c) Wikipedia, [Online]. Retrieved from the Internet: <URL:http://en.wikipedia.org/wiki/Thin_client>, (Accessed Feb. 15, 2008), 13 pgs.

"Thin Client Computing", [Online]. Retrieved from the Internet: <URL: http://web.archive.org/web/20040122033629/http://www.thinclient.net>, (Jan. 22, 2004), 24 pgs.

"Yahoo! Auctions Celebrates One-Year Anniversary; As Online Auction Usage Continues to Grow, Yahoo! Is Quickly Becoming the World Marketplace of the New Millennium", Business Wire, (Sep. 14, 1999), 3 pages.

Akin, David, "Web retailing gains market muscle as concerns fade: Record season: Increasing number of sites catering for Canadian dollars", Financial Post, p04, XP002905105, (Dec. 26, 1998), 3 pages.

Alice, Michele, "eBay's 'Mister Lister' Auction Management Software", Auctionbytes-Update, No. 22, [Online]. Retrieved from the Internet: <URL: http://www.auctionbytes.com/cab/abu/y200/m09/abu0022/s05>, (Sep. 24, 2000), 3 pgs.

Business Wire, "Bay Builder Releases Major Innovation for Online Wireless Auctions.", Recovered via Dialog Database on Feb. 15, 2008, (Mar. 10, 2000), 2 pgs.

Business Wire, "Mediappraise Receives National Award for Web-based Technology That Enables Companies to Solve Thorny HR Problem", Business Wire, (Dec. 14, 1998), 1-2.

Business Wire, "Subasta.com, the Premier Online Auction Board for Latin America, Spain, and the Hispanic Sector of the U.S., Has Attracted Over 60,000 Viewers in Less Than Two Months!", Business Wire, (Jul. 16, 1999), 2 pages.

Clemons, E., "Evaluating the prospects for alternative electronic securities", Proceedings of ICIS 91: 12th International Conference on Information Systems, (Dec. 16-18, 1991), 53-63.

Collete, Stacy, "Thin Clients Pull in Car Customers: Auto Auction company eyes move to Web.(Industry Trend or Event)", Computerworld recovered via dialog database on Feb. 15, 2008, (Apr. 5, 1999), p. 41(1).

Grubbs, L., "Top 5 auction utilities", PC World.com, San Francisco, CA, (Dec. 4, 2000), 2 pgs.

Hansell, Saul, "Meg Whitman and eBay, Net Survivors", New York Times, (May 5, 2002), 5 pgs.

Hess, C. M, et al., "Computerized Loan Organization System: An Industry Case Study of the Electronic Markets Hypothesis", MIS Quarterly, vol. 18(3), (Sep. 1994), 251-275.

Hutchinson, Art, "E-Commerce : Building a Model", Art. Communications Week recovered via Dialog Database on Feb. 15, 2008., (Mar. 17, 1997), p. 57.

M2 Presswire, "United Technologies: UTC's Carrier Corp. teams with FreeMarkets to create largest Asian-based B2B online auction market to date; UTC Division identifies average annual savings of more than 16 percent on electric motors through FreeMarkets B2B eMarketpla", M2 Presswire, (Mar. 22, 2000), 2 pages.

Malone, T., et al., "Electronic Markets and Electronic Hierarchies", Communications of the ACM, vol. 30, No. 6, (Jun. 1987), 484-497.

Mardesich, Jodi, "Site Offers Clearance for End-of-Life Products—Onsale Takes Auction Gavel Electronic", Computer Reseller News, (Jul. 8, 1996), 2 pps.

Massimb, Marcel, "Electronic Trading, Market Structure and Liquidity", Financial Analysts Journal, 50(1), (Jan./Feb. 1994), 39-50.

Meade, J., "Visual 360: A Performance Appraisal System That's 'Fun'", HR Magazine, Society for Human Resource Management., (Jul. 1999), 3 pgs.

Merrill, K., "GE Capital to Extend Integrator Buying Spree", Computer Reseller News, (Jul. 1996), pp. 2 and 32.

Neo, B. S, "The implementation of an electronic market for pig trading in Singapore", Journal of Strategic Information Systems; vol. 1(5), (Dec. 1992), 278-288.

Post, D. L, et al., "Application of auctions as a pricing mechanism for the interchange of electric power", IEEE Transactions on Power Systems, 10(3), (Aug. 1995), 1580-1584.

Resnick, Paul, "Reputation systems", Communications of the ACM, 43(12), (Dec. 2000), 45-48.

Rockoff, T. E, et al., "Design of an Internet-based system for remote Dutch auctions", Internet Research: Electronic Networking Applications and Policy, vol. 5(4), (Jan. 1, 1995), 10-16.

Schmid, B. F, "The Development of Electronic Commerce", EM—Electronic Markets, No. 9-10, (Oct. 1993), 2 pgs.

Siegmann, Ken, "Nowhere to go but up", PC Week; vol. 12(42), Ziff-Davis Publishing Company, (Oct. 23, 1995), 1-3.

Tjostheim, Ingvar, et al., "A case study of an on-line auction for the World Wide Web", Norwegian Computing Center (NR), [Online]. Retrieved from the Internet: <URL: http://www.nr.no/~ingvar/enter98.html>, (Accessed Feb. 21, 2005), 1-10.

Warbelow, A, et al., "Aucnet: TV Auction Network System", Harvard Business School Case/Study, HBVR#9-190-001, USA, (Jul. 1989), 1-16.

U.S. Appl. No. 09/602,110, Decision on Pre-Appeal Brief mailed Mar. 28, 2014, 2 pgs.

U.S. Appl. No. 10/252,129, Amendment filed May 20, 2014, 17 pgs.

U.S. Appl. No. 13/285,916, Final Office Action mailed Apr. 23, 2014, 16 pgs.

U.S. Appl. No. 14/231,613, Preliminary Amendment Apr. 14, 2014, 8 pgs.

U.S. Appl. No. 14/231,624, Preliminary Amendment filed Apr. 14, 2014, 9 pgs.

(56) References Cited

OTHER PUBLICATIONS

U.S. Appl. No. 14/231,633, Preliminary Amendment Apr. 14, 2014, 8 pgs.
U.S. Appl. No. 14/231,639, Preliminary Amendment Apr. 11, 2014, 8 pgs.
U.S. Appl. No. 14/231,650, Preliminary Amendment filed Apr. 9, 2014, 8 pgs.
U.S. Appl. No. 14/231,684, Preliminary Amendment filed Apr. 9, 2014, 8 pgs.
U.S. Appl. No. 14/231,696, Preliminary Amendment filed Apr. 9, 2014, 8 pgs.
U.S. Appl. No. 14/231,706, Preliminary Amendment filed Apr. 9, 2014, 8 pgs.
U.S. Appl. No. 14/231,719, Preliminary Amendment filed Apr. 9, 2014, 8 pgs.
U.S. Appl. No. 14/231,722, Preliminary Amendment filed Apr. 9, 2014, 8 pgs.
U.S. Appl. No. 14/268,986, Preliminary Amendment filed May 5, 2014, 7 pgs.
U.S. Appl. No. 14/268,986, Supplemental Preliminary Amendment filed May 9, 2014, 7 pgs.

* cited by examiner

SCHEDULE SYNCHRONIZATION

FILE  EDIT  VIEW  TOOLS  HELP

☼ ▷ 📄 📄 🖨 📄 💲
NEW   EDIT PREVIEW PRINT DELETE SYNCHRONIZE

| ITEM INVENTORY (7) ▽ | | ITEM TITLE | ITEM LABEL | FORMAT | CURRENT PRICE | WATCHERS | BIDS | QUESTIONS | TIME LEFT |
|---|---|---|---|---|---|---|---|---|---|
| WAITING TO UPLOAD (7) | | | | | | | | | |
| LISTING ACTIVITY (12) ▷ | 💲 | HARRY POTTER PRISONER... | POTTER PRISO... | FIXED | $3.65 | 4 | 9 | 0 | 3d 21h 18m |
| ☐ SCHEDULE LISTINGS (4) | ◇ | HARRY POTTER PRISONER... | POTTER PRISO... | FIXED | $0.99 | 4 | 9 | 0 | 3d 21h 18m |
| ☐ ACTIVITY LISTINGS (4) | ◇ | HARRY POTTER PRISONER... | POTTER PRISO... | FIXED | $7.45 | 1 | 10 | 1 | 3d 21h 18m |
| ☐ ENDED LISTINGS (4) | ◇ | HARRY POTTER PRISONER... | POTTER PRISO... | FIXED | $14.45 | 0 | 13 | 0 | 3d 21h 18m |
| | | THIS LISTING HAS PENDING REVISIONS | | | | | | | |
| SOLD (26) ▽ | | | | | | | | | |
| ARCHIVED (26) | | | | | | | | | |

🔍 SEARCH...

*FIG. 13*

| | ITEM TITLE | FORMAT | QTY | DURATION | START PRICE | RESERVE | BUY IT NOW PRICE | ITEM LABEL | MC |
|---|---|---|---|---|---|---|---|---|---|
| | UNBREAKABLE DVD (2001) | AUCTION | 1 | 7 | $0.99 | $5.00 | $11.99 | $11.99 | 6/16/ |
| | CADDYSHACK DVD | AUCTION | 1 | 7 | $9.99 | $ | $ | $ | 12/16 |

*FIG. 14*

BUSINESS CHANNEL SYNCHRONIZATION

TECHNICAL FIELD

The present application relates generally to the technical field of data processing and, in one specific example, to business channel synchronization in network based commerce systems.

BACKGROUND

In typical networked-based publication systems, a buyer can enter a commerce system's web-site and from the listings published in the web-site, select a desired listing and participate, if the listing is on auction, in the bidding process. The bidding process starts by entering the website and watching the last bid before deciding to bid on a specific listing. In other words, buyers typically interact with the commerce system through the website and are able to see, on any listing, the latest updates uploaded by the seller.

Sellers may have access to other tools provided by the networked-based commerce systems in the form of offline client applications. An example of such a client application is eBay Turbo Lister. Using these offline tools, sellers can introduce new listings by entering information on a specific listing, such as: listing description, start price, type of sale (fixed-price vs. auction), auction start time, auction duration, etc. Sellers may be able to update their online listings, from the client application. Moreover, listing revisions, for the most part, are done on a one-off basis and are manual and tedious for the user. Any entering of a new listing or editing of the existing listings does not affect the online data on the web site until it is manually uploaded by the seller to the system.

The synchronization of data between a network-based publication (or data) system and its client applications, or between a client application and multiple data or publication systems present a number of technical challenges. For example, editing of active listings directly from within the client application and having access to the latest information, as displayed on the site, from a client application.

BRIEF DESCRIPTION OF THE DRAWINGS

Some embodiments are illustrated by way of example and not limitation in the figures of the accompanying drawings in which:

FIG. 11 is a screen shot illustrating an example embodiment of an initial synchronization dialog box;

FIG. 12 is a screen shot illustrating an example Active Listings view of a client application window related to a real time synchronization;

FIG. 13 is a screen shot illustrating an example active listings view of a client application window related to scheduled synchronization;

FIG. 14 is a screen shot illustrating an example view of a synchronize toolbar of a client application window;

DETAILED DESCRIPTION

Example methods and systems to synchronize the data between a server system and its client applications, or between a client application and multiple server systems are described. In the following description, for purposes of explanation, numerous specific details are set forth in order to provide a thorough understanding of example embodiments. It will be evident, however, to one skilled in the art that the present invention may be practiced without these specific details.

A method and a system of business channel synchronization are provided. In one example embodiment, a networked system (e.g., network-based commerce system or a network-base publication system) may receive, via a network and from a client application, update data related to a user listing, update a record related to the user listing, utilizing the received update data; and communicate, via the network, an update data reflecting a further update to the record related to the user listing to the client application.

In one example embodiment, a user may synchronize the user's listing data from a client application to one or more network-based commerce systems. In an alternative example embodiment the user may synchronize the user's listing data from one or more network-based commerce systems to a client application.

The synchronization of the network-based commerce system with the client application enable selling managers, from a remote location, to be able to simultaneously see the information entered into the client applications by seller agents, for which they are responsible. The managers or their agents may benefit from the integration of simultaneous access to the latest information on the sales of their listings to the client application by increased efficiency.

Platform Architecture

Figure 1:
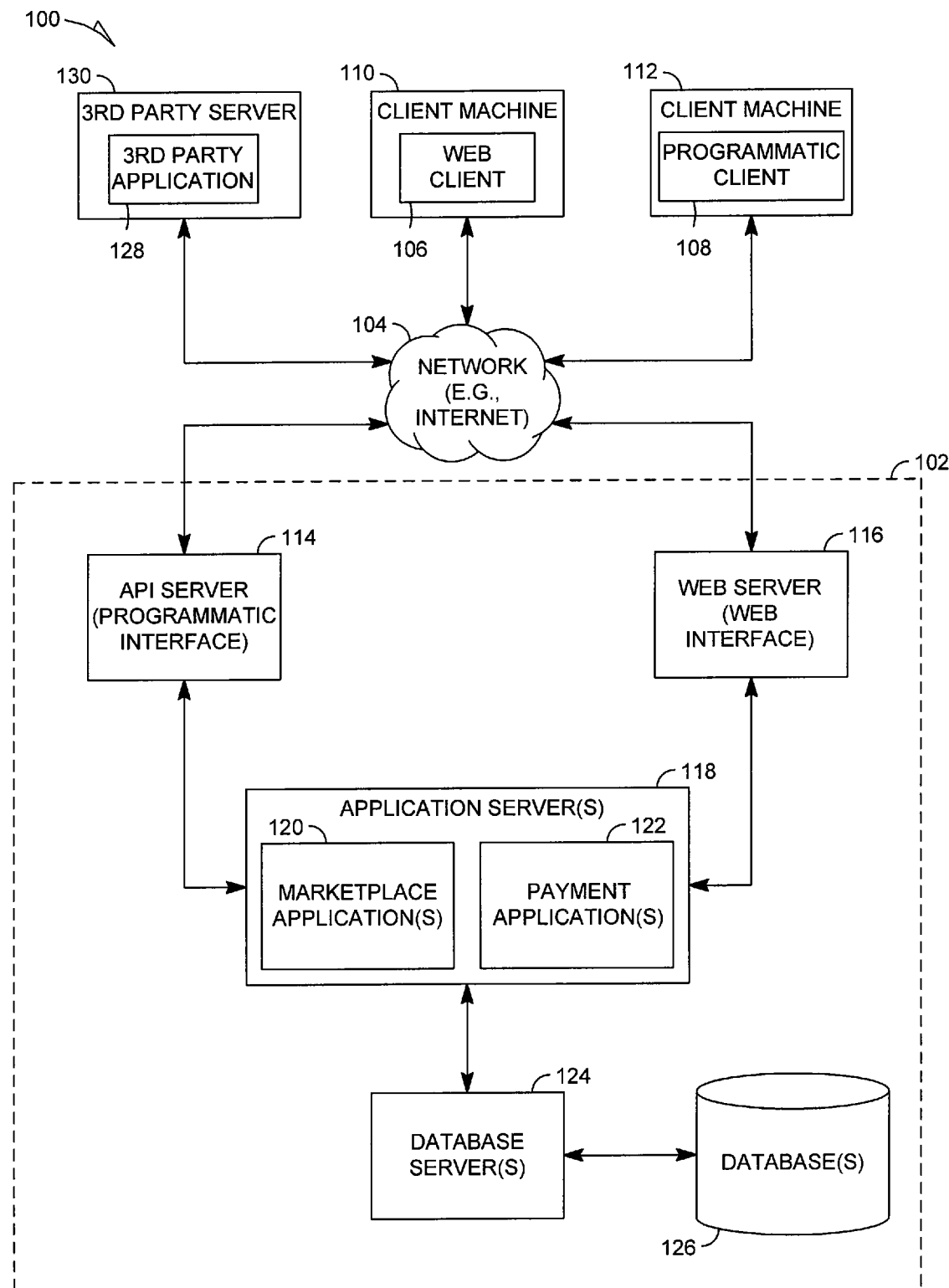
FIG. 1 is a network diagram depicting a client-server system within which one example embodiment may be deployed.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or Wide Area Network (WAN)) to one or more clients. FIG. 1 illustrates, for example, a web client 106 (e.g., a browser, such as the WINDOWS® INTERNET EXPLORER® browser developed by Microsoft Corporation of Redmond, Wash. State), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more databases servers 124 that facilitate access to one or more databases 126.

The marketplace applications 120 may provide a number of marketplace functions and services to users that access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the present invention is of course not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the Turbo Lister application developed by ebay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace or payment functions that are supported by the relevant applications of the networked system 102.

Marketplace Applications

Figure 2:
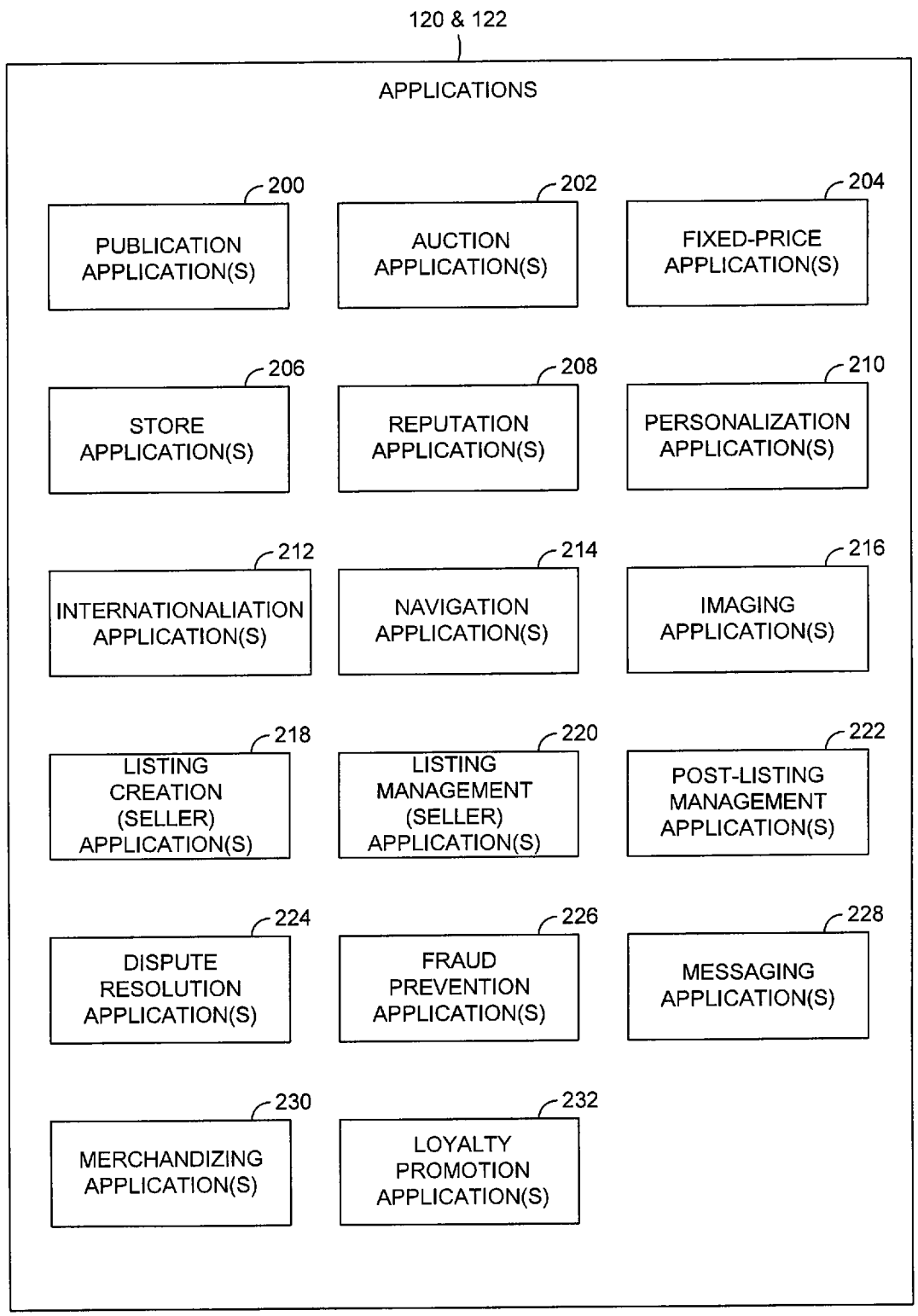
FIG. 2 is a block diagram illustrating multiple applications that, in one example embodiment are provided as part of the networked system.

FIG. 2 is a block diagram illustrating multiple applications 120 and 122 that, in one example embodiment, are provided as part of the networked system 102. The applications 120 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access server one or more database(s) 126 via the database server(s) 128.

The networked system 102 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 120 are shown to include at least one publication application 200 and one or more auction applications 202 which support auction-format listing and price setting mechanisms (e.g., English, Dutch, Vickrey, Chinese, Double, Reverse auctions etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives and features that are specific and personalized to a relevant seller.

Reputation applications 208 allow users that transact, utilizing the networked system 102, to establish, build and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user, for example through feedback provided by other transaction partners, to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace, or may be customized (or internationalized) presentations of a common underlying marketplace. The networked system 102 may accordingly include a number of internationalization applications 212 that customize information (and/or the presentation of information) by the networked system 102 according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application) may enable key word searches of listings published via the networked system 102. A browse application may allow users to browse various category, catalogue, or inventory data structures according to which listings may be classified within the networked system 102. Various other navigation applications may be provided to supplement the search and browsing applications.

In order to make listings, available via the networked system 102, as visually informing and attractive as possible, the marketplace applications 120 may include one or more imaging applications 216 utilizing which users may upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers conveniently to author listings pertaining to goods or services that they wish to transact via the networked system 102, and listing management applications 220 (also referred to as "listing management module") allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur as post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller conveniently to provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102, such messages for example advising users regarding the status of listings at the networked system 102 (e.g., providing "outbid" notices to bidders during an auction process or to provide promotional and merchandising information to users). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 230 support various merchandising functions that are made available to sellers to enable sellers to increase sales via the networked system 102. The merchandising applications 80 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotions applications 232. For example, a buyer may earn loyalty or promotions points for each transaction established and/or concluded with a particular seller, and may be offered a reward for which accumulated loyalty points can be redeemed.

Flowcharts

Figure 3:
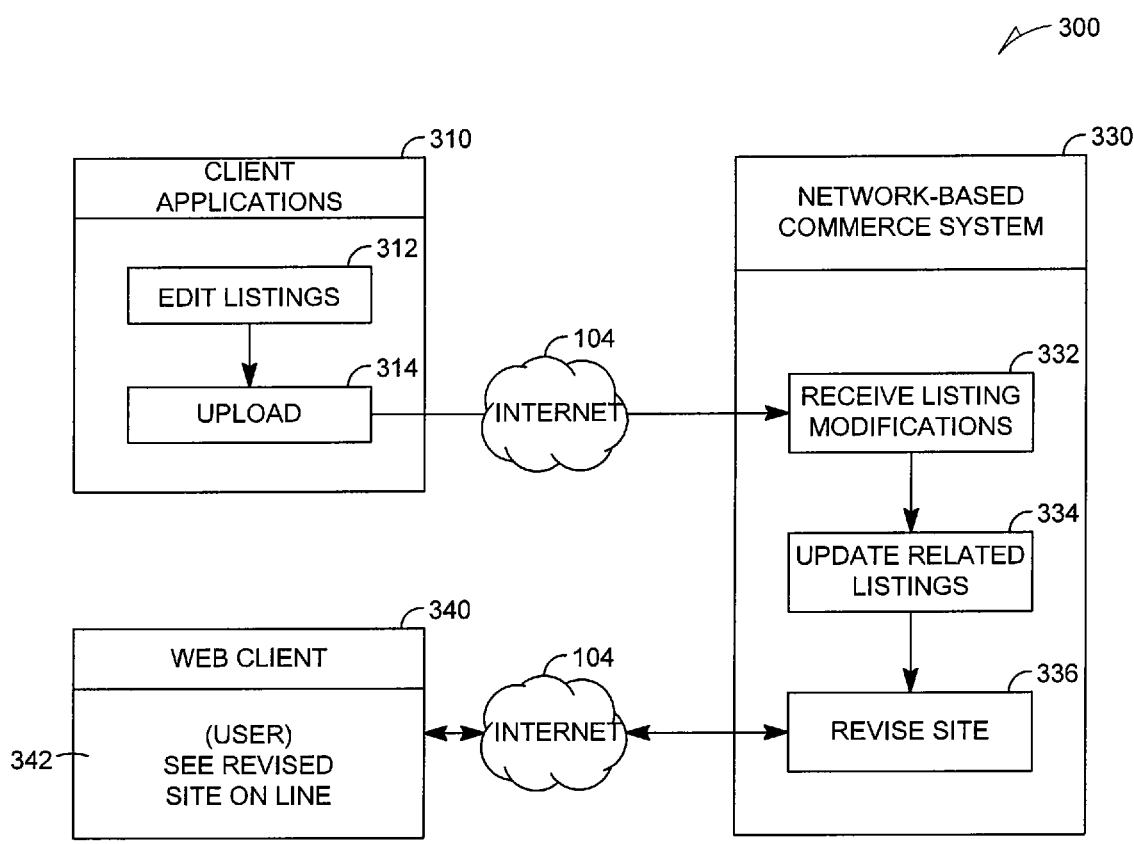
FIG. 3 is a high-level flow diagram illustrating an example embodiment of updating data related to a user listing.

FIG. 3 is a high-level flow diagram, illustrating an example embodiment of a method 300 of updating data related to a user listing. The example embodiment involves updating, by a commerce system 330, of one or more records related to a user listing, based on the data received from a client application 310 using the following operations. The client application 310 and the commerce system may communicate via the network 104 (e.g., the Internet).

From the client application 310, a user may, inter alia, create the first update data by generating new listing or modifying an existing listing (operation 312). For example, a user may edit an existing listing by modifying some of the attributes of the listing, such as extending the end date, changing asking price, etc.

The user then, from the client application 310, may upload (operation 314) the first update data to the commerce system 330 via network 104.

In example embodiments, the first update data may include a description of the user listing, a modification of the description included in the user listing, or removal of the user listing from publication by the network-based commerce system.

At operation 332, the commerce system 330 may receive the first update data from the client application 310 via network 104. Based on the received data, at operation 334, the commerce system 330 may update a first record related to the user listing. The client application 310 may have uploaded updates for more than one listing, thus at update operation 334, one or more records related to the user listing may be changed depending on the data received from the client application 310.

Figure 4:
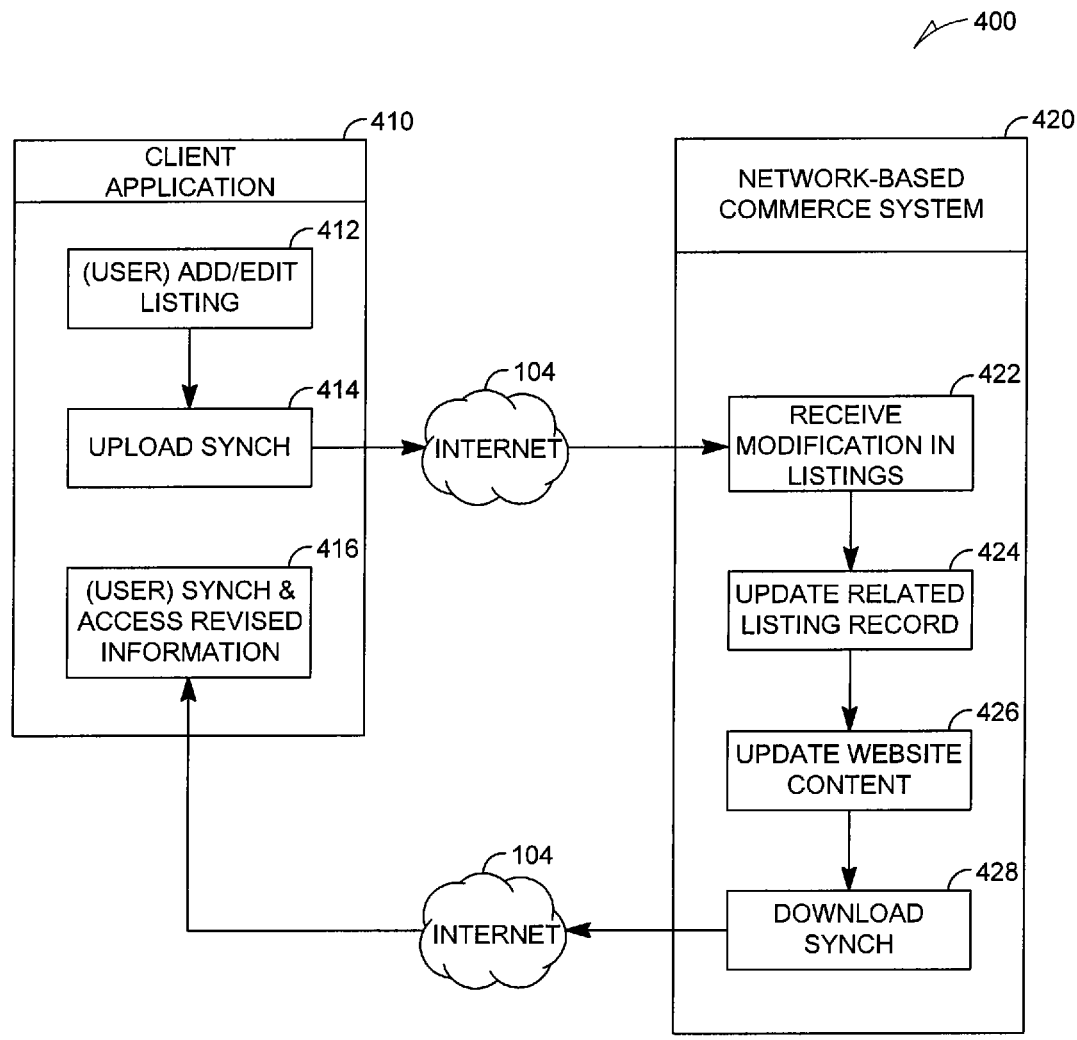
FIG. 4 is a high-level flow diagram illustrating an example embodiment of a method for synchronized updating of the data related to a user listing.

The modification or updates to the data related to the user listing may be stored in the database(s) 126 (FIG. 1) and made available online to a web client 340 via the web server 116 of FIG. 1 (operation 336). The user may then enter, via network 104, the network-base commerce system 330 using the web client 340 and through operation 342 observe the updates in the listing FIG. 4 is a high-level flow diagram, illustrating an example embodiment of a method 400 for synchronized updating of the data related to a user listing. The example method 400 involves synchronization between a client application 410 and a commerce system 420, wherein the data related to a user listing received from the client application 410 may be used to update the existing record(s) related to that listing and all changes in the commerce system 420 may be automatically reflected in data stored by the client application 410.

At operation 412, the user may use the client application 412 to introduce a new listing or create a first update (e.g., edit an existing listing and possibly modifying some of the attributes of the listing such as extending the end date, changing asking price, etc.), At operation 414, the user may use the client application 410 to upload (operation 414), via network 104, the first update data to the commerce system 420. The upload operation 414 may include a synchronization command to the commerce system 420 specifying a time for synchronization (e.g., updating one or more record(s) related to a user listing(s), based on the data uploaded via the client application) to take place.

At operation 422, the commerce system 420 may receive the first update data (e.g., listing modifications) from the client application 410, and based on that and, according to the specifics of the synchronization command, at operation 424 the commerce system 420 may update a first record related to the user listing (e.g., synchronize the commerce system 420 with client application 410).

The client application 410 may have uploaded updates for more than one listing, thus at update operation 424, one or more records related to the user listing may be changed depending on the data received from the client application 410.

The modification or updates in the data related to the user listing may be stored in the database(s) 126 (FIG. 1) and also used to alter the content of the web page associated to that listing on the commerce system 420 web site at operation 426. The page is made available online to the web clients via the web server 116 of the networked system 102 (FIG. 1).

In the example embodiment 400, the commerce system 420 may also, at a download synchronization operation 426, communicate, via the API server 114 (FIG. 1), second update data to the client application 410.

In an example embodiment, the second update data may include data related to a sale of an offering that is the subject of the user listing in an auction or as a fixed price listing. In another example embodiment, the second update data may include data related to a current bid related to the user listing offered for sale in the commerce system. In another example embodiment, the second update data may include data related to a message communicated by the client application (e.g., email messages communicated between prospect buyers or real buyers and the seller or between the commerce system and the seller).

In another example embodiment, the second update data may reflect a further update to the first record related to the user listing including updates to the data related to a user listing (e.g. changes following the synchronization of the commerce system 420 with the client application 410).

The client application 410 may receive the second update data from the API server 114, via the network 104 (e.g., the Internet), and at operation 416, update a second record related to the user listing using the second update data received from the networked-based commerce system 420. The operation 416 may include updating more than one record related to the user listing(s), depending on the updates received from the commerce system 420.

Figure 5:
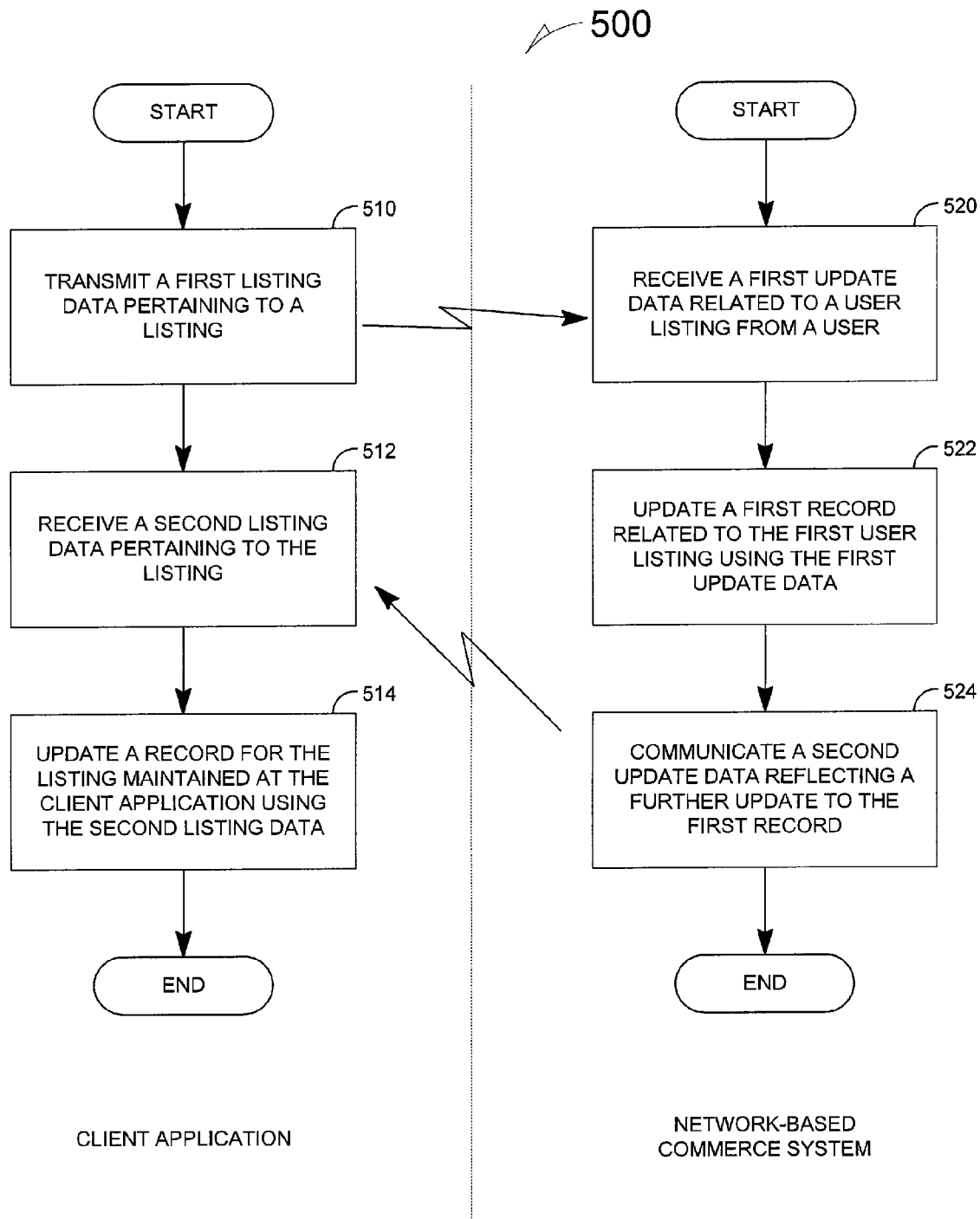
FIG. 5 is a high-level flow diagram illustrating an example embodiment of a method for client application synchronizing to a commerce system.

FIG. 5 is a high-level flow diagram, illustrating an example embodiment of a client application-commerce system synchronization process 500. At the client application side, the process 500 starts at operation 510, with the client application 410 transmitting (e.g., uploading) first listing data pertaining to a user listing to the commerce system 420 via the network 104 (e.g., the Internet). The first listing data may include revisions on an existing listing data such as modifications of some of the attributes of the listing (e.g., including but not limited to extending the end date, changing asking price, etc.).

At operation 512, a client application 420 may receive from the commerce system 420, via the network 104 (e.g., the Internet), second listing data pertaining to the listing (e.g., the update data communicated by the commerce system 420). Based on the received data from the commerce system 420, the client application 410 may update one or more records for the listing(s) maintained at the client application (operation 514). This updating may constitute synchronization of the client application 410 with commerce system 420 and may facilitate the user's access to updates on the listings without the need for logging onto the commerce system web site.

At the commerce system side, the example process 500 starts with operation 520. In this operation, the commerce system 420, receives first update data (e.g., uploaded by the client application 410 in operation 510) related to a user listings, the first update data being received via the network 104 from the client application 410. The update data may include data related to more than one listing or modification of one or more attributes of one or more listings.

At operation 522, based on the first update data received from the client application 410 in operation 520, a first record related to the first user listing update is updated at the commerce system 420. The update may involve one or more records, based on the first update data received from the client application 410, if such data pertains to more than one listing. This operation may constitute synchronization of the commerce system 420 with the client application 410.

The modification or updates in the data related to the user listing may be stored in the database(s) 126 (FIG. 1) and also used to alter the content of the web page related to that listing on the commerce system 420 web site. The synchronized listing data may be made accessible to the on line users via web server 116 of FIG. 1.

At the next operation 524, the commerce system 420 may communicate, second update data, reflecting a further update to the first record related to the user listing, to the client application 410 via the network 104. This operation may include performing updates to the data related to a user listing, including making changes following the synchronization of the commerce system 420 with the client application 410, bidding data (e.g. current bid), sales data or messages communicated by the client application, such as email messages.

Figure 6:
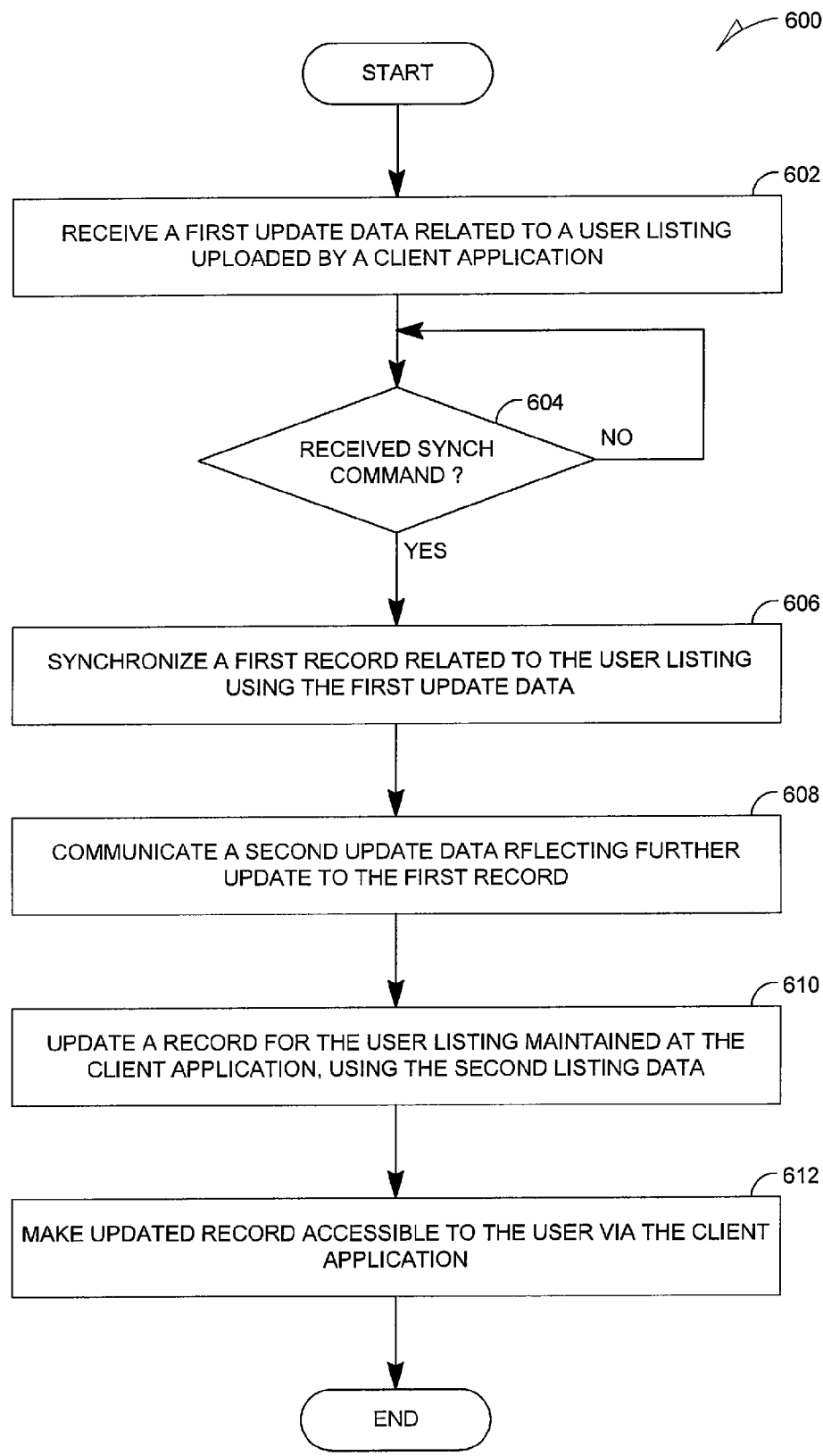
FIG. 6 is a flow diagram illustrating an example embodiment of a method for a network-base commerce system synchronizing with a client application.

FIG. 6 is a flow diagram, illustrating an example embodiment of a method 600 for a network-base commerce system to synchronize with a client application. The example method 600 includes operations 602 through 612. At operation 602, the commerce system 420 receives first update data related to a user listing uploaded by the client application 410.

At decision operation 604, the commerce system 420 may check to see whether a synchronization command has been received. If no synchronization command has been received, the commerce system 420 may wait for a synchronization command before performing any synchronization. Otherwise, if a synchronization command has been received, at operation 606, the commerce system 420 may synchronize a first record related to the first user listing using the first update data received from the client application 410 (e.g., uploaded by the client application 410 in operation 510). The update may include data related to more than one listing or modification of one or more attributes of one or more listings.

At operation 608, the commerce system 420 may communicate second update data reflecting further an update to the first record. This operation may include making updates to the data related to a user listing, including making changes following the synchronization of the commerce system 420 with the client application 410, or as result of new bids, change of status, such as listing being sold, etc.

The next operation 610 may involve updating one or more records for the user listing maintained at the client application 410, using the second listing data (e.g., the bidding data, sale of an offering that is the subject of the user listing, and messages communicated by the client application, such as email messages) communicated by the commerce system 420 to the client application 410. This operation may constitute synchronization of the client application 410 with commerce system 420. The client application 410 may make all updates accessible to the user at operation 612. This may help the user to access updates on the listings, without any extra time and effort spent logging into the commerce system 420 to see the update.

Figure 7:
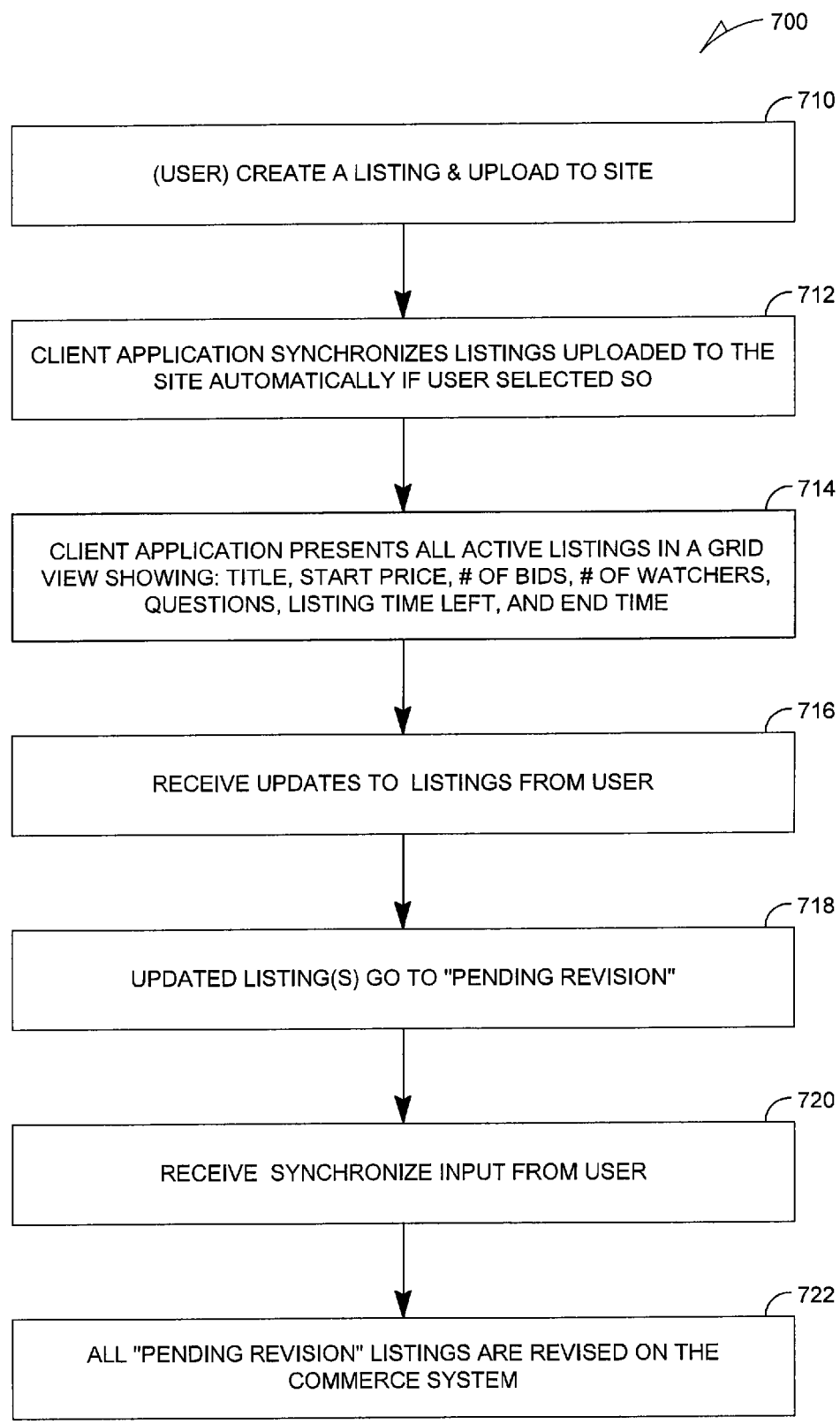
FIG. 7 is a flow diagram illustrating an example embodiment of method for a real-time client application-commerce system synchronization.

FIG. 7 is a flow diagram, illustrating an example embodiment of a method 700 for a real-time client application-commerce system synchronization. The example method 700 starts at operation 710, with a user may be creating one or more listings or modify attributes of one or more listings, and uploading such data to the commerce system 420. The uploading may include transmitting the data via the network 104 to the commerce system 420. The client application 410 may, following the upload, send a synchronization command to the commerce system 420, in order to have the commerce system 420 automatically synchronize to the uploaded data (operation 712).

At operation 714, the client application 410 presents the user with one or more active listings in a grid view showing, inter alia, title, start price, number of bids, number of watchers, questions, listing time left, and end time. From this view, the user may update any selected listings as desired (operation 716).

At the next operation 718, the updated listing(s) may be placed in a "pending revision" status (see FIG. 13). The user may then click on "Synchronize Now" button to synchronize, at operation 720, updated versions of listing data as stored by the web site with the revised versions of listing data as uploaded by the client application 410. This operation causes the client application 410 to send, via the network a synchronization command to the commerce system 420. Thereafter, at operation 722, the synchronization operation may be performed, and all the listings shown as pending revision may be revised on the commerce system 420.

Figure 8:
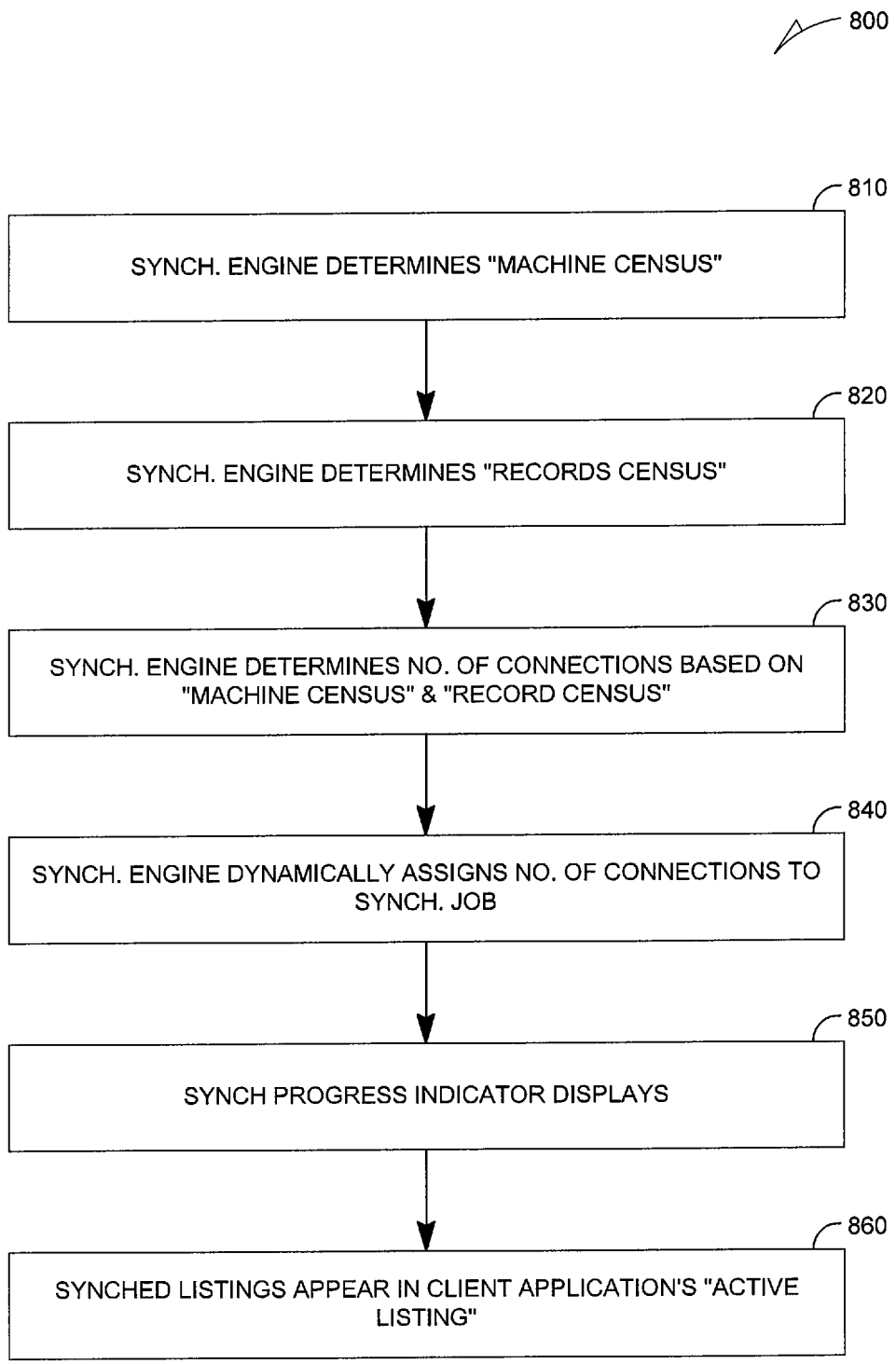
FIG. 8 is a flow diagram illustrating an example embodiment of a method for a client application-commerce system synchronization including pre-synchronization.

FIG. 8 is a flow diagram, illustrating an example embodiment of a method 800 for a client application-commerce system synchronization including pre-synchronization checks. Prior to synchronization, at operation 810, a synchronization engine (module 916 in FIG. 9 described below) may determine the Central Processing Unit (CPU) speed, total memory, available memory, bandwidth available and the operating system of the client machine. This is referred to as "machine census" (see operation 810). The synchronization engine 916 may also determine, at operation 820, the approximate number of items it needs to synchronize from both the client application 410 and the commerce system 420. This number is referred to as "records census."

At operation 830, the synchronization engine 916 may determine the number of connections it needs to open to begin the synchronization process by examining the machine and records censuses. The number of connections used may vary depending on the machine and records censuses. A matrix may be created to determine the optimal number of connections to open and at operation 840, and the synchronization engine 916 dynamically assigns the appropriate number of connections to the synchronization job. Before the initial synchronization begins, the user may be presented with the number of records that will be processed and the approximate amount of time this will take.

In the next operation 850, a synchronization process indicator may be displayed to show that the synchronization is occurring. The user may be able to see the synched listings as they appear in the client application's "Active Listings" (see operation 860).

System Architecture

Figure 9:
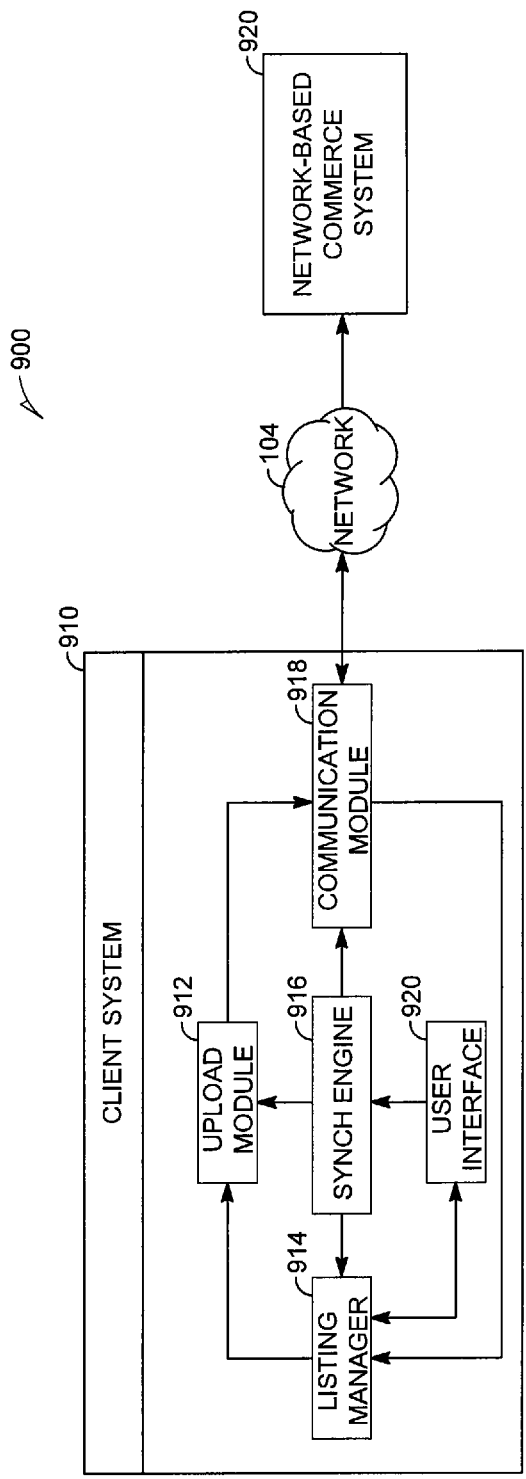
FIG. 9 is a diagrammatic representation of an example embodiment of a client system capable of synchronizing with a server system.

FIG. 9 is a diagrammatic representation of an example embodiment of a client system 910 capable of synchronizing with a commerce system. The client system 910 may synchronize with the commerce system 920 by communicating data via the network 104. The client system 910 may include a listing manager 914, an upload module 912, a synchronization engine 916, a user interface 920, and a communication module 918.

The listing manager 914 may be responsible for handling user listing information, including receiving and communicating the data within the modules in the client system 910. The listing manager 914 may receive inputs from any of the user interface 920, the communication module 918, and the synchronization module 916.

The inputs from the user interface may include new listings with their attributes (e.g., price, quantity, specification, start time, end time, etc.), any modification on the previous listings such as change in certain attributes such as end time if the listing is active, and in case the listing is not yet active, changes in any other attributes or even withdrawal of the listing from sale.

The inputs from the communication module 918 may include update data reflecting the changes in the user listing records received from the commerce system 920.

The listing manager 914 may also receive control signals from the synchronization module 916. These signals may include commands to receive updates from the communication module 918, or to transfer updates or data related to new listings to the upload module 912.

The upload module 912 may receive updates or new data related to the user listings and upon receipt of a control signal from the synchronization engine 916, it may transfer the data to the communication module 918 to be communicated, via the network 104, to the commerce system 104.

The synchronization engine 916 may play the role of a control module, receiving control inputs from the user interface 920 and sending control signals to the listing manager 914, the upload module 912, and the communication module 918. The inputs from the user interface 920 may include synchronization related data such as commands to send updates to the commerce system 920 or data related to a scheduled time for such synchronization. The input to the synchronization engine 916 may also include commands related to synchronization of the client system with the commerce system 920 (e.g., updates received from the commerce system 920).

The control signal outputs to the listing manager 914 may include commands to receive updates from the communication module 918 or to transfer updates or data related to new listings to the upload module 912. The control signal output to the upload module 912 may include commands to transfer data to the communication module. The control signal outputs to the communication module 918 may include commands to communicate data to or receive data from the commerce system 920, via the network 104.

The synchronization engine 916 may also perform other tasks, as explained under the description of FIG. 8, including performing the machine census and the records census, and dynamically assigning a number of connections to the synchronization jobs.

The communication module 918 may receive synchronization control signal from the synchronization module 916 and listing data from the upload module 912. This module 918 may communicate data, via network 104, to the commerce system 920. The communication may include transmitting user listing updates received from the upload module 912 to the commerce system 104 and receiving updates occurring at the commerce system 920 (e.g., the bidding data, sales data, and messages communicated by the client application, such as email messages) from that system. Other tasks performed by the communication module 918 may include transferring the updates received from the commerce system 920 to the listing manager 914.

Figure 10:
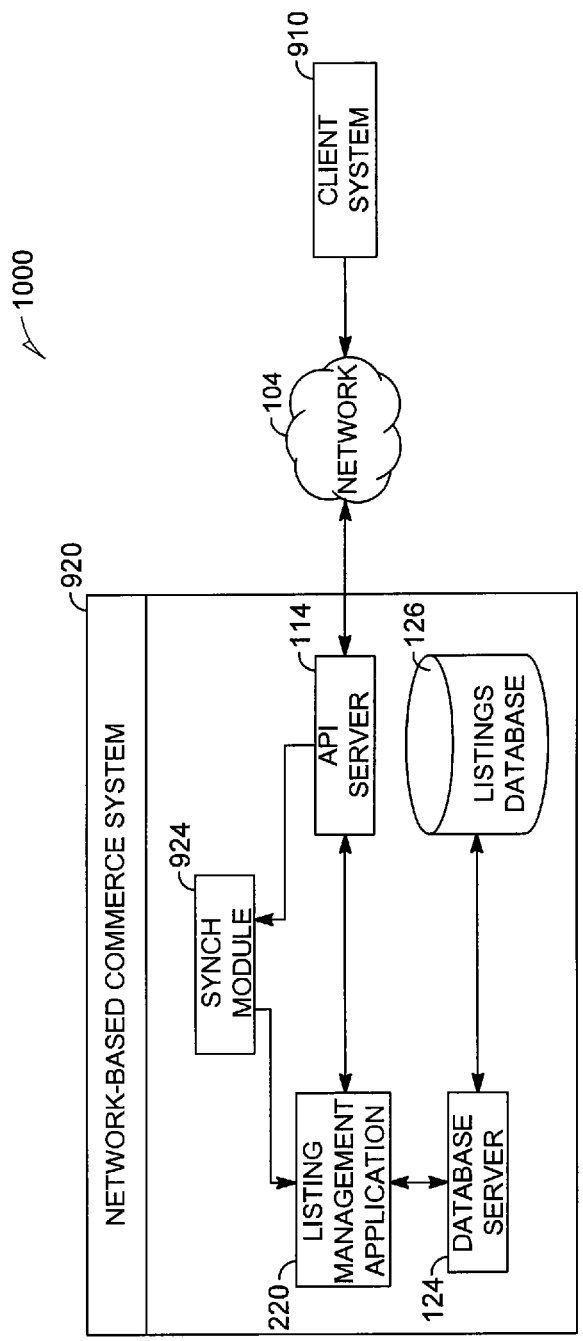
FIG. 10 is a diagrammatic representation of an example embodiment of a server system capable of synchronizing with a client application.

FIG. 10 is a block diagram 1000 of an example embodiment of a commerce system 920 capable of synchronizing with a client application. The commerce system 920 may synchronize with the client system 910 by communicating data via the network 104. The commerce system 920 may include a listing management application 220, a synchronization module 924, an API server 114, a database server 124, and a listing database 126.

The listing management application 220 may allow sellers to manage seller listings. Specifically, where a particular seller has authored and/or published a large number of listings, the management of such listings may present a challenge. The listing management applications 220 may provide a number of features (e.g., auto-relisting, inventory level monitors, etc.) to assist the seller in managing such listings.

In the context of the example commerce system representation 920, the listing management application 220 may receive update data from the API server 114 and control signals from the synchronization module 924. It may also receive data from the database server 124. The update data received from the API server 114 may include data received, via the network 104, from the client application 910. The control signal received by the listing management application 220 from the synchronization module 924 may include a command to synchronize the commerce system 920 with the updates received from the client application 910.

The listing management application 220 may request and receive data from the listing database 126 via the database server 124. Such data may include updated user listing data records to be communicated to the client application in a download synchronization operation 428 (see FIG. 4). The listing management application 220 may send listing update data to API server 114 and to the database server 124. The synchronization module 924 configures synchronization process by receiving timing data specifying the start of the synchronization (e.g., scheduled timing information related to such synchronization to be performed in the future) from the API server 114 and accordingly sending proper commands to the listing management application 220 to start synchronization.

The API server 114 may provide the client system 910 with a programmatic access to the commerce system 920, via the network 104. The API server 114 may receive the user listing data uploaded by the client system 910 and may transfer the data to the listing management application 220. This data may include new listings with their attributes (e.g., price, quantity, specification, start time, end time, etc.), any modification on the previous listings such as change in certain attributes such as end time, if the listing is active, and in case the listing is not yet active, change in any other attributes or even withdrawal of the listing from sale The API server 114 may also receive listing update data from the listing management application 220, and communicate them, via the network 104, to the client system 910. The API server 114 may transfer the user listing data received from the client system 910 to the listing management application 220. It may also transfer synchronization commands or timing data related to start of synchronization process to be performed in the future, received from the client system 920, to the synchronization module 924.

The database server 124 may facilitate access to the listing database(s) 126. In the context of the example commerce system representation 920, the database server 120 is coupled to the listing management application 220 and, therefore, facilitates storage into the listing database 126 of data received from the listing management application 220, and also retrieval of the data needed by the listing management application 220 from the listing database 126.

User Interfaces

Figure 11:
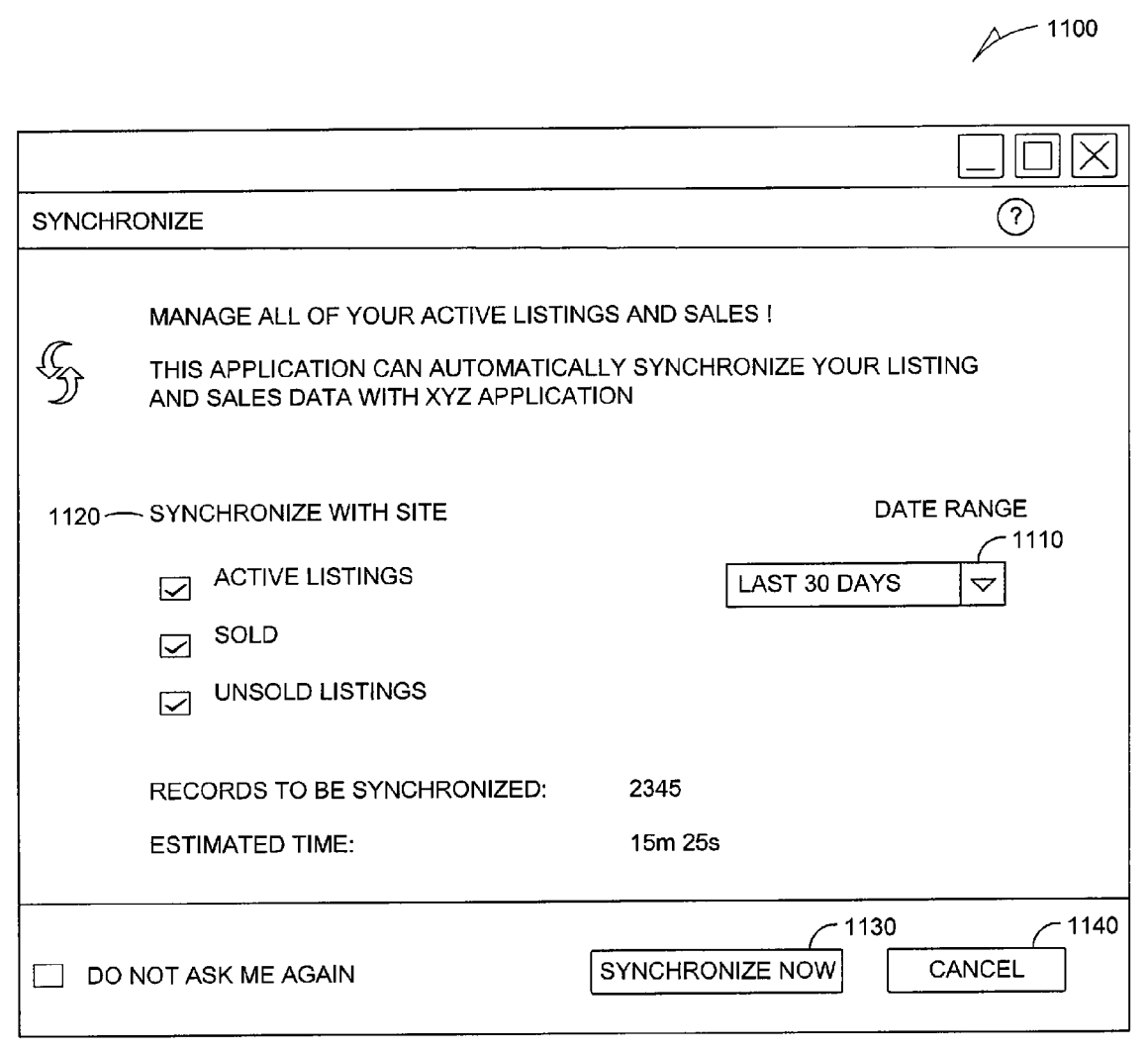

FIG. 11 is a screen shot, illustrating of an example embodiment of an initial synchronization dialog box 1100. If no initial synchronization has taken place at the time the user uploads first listings to the site, the client application 410 may prompt the user to ask whether the user wants to synchronize listing activities. The user may change the settings for the synchronization by using the dialog box 1100, which is presented to the user after clicking Tools and then Options & Preferences in the client application main window. In the dialog box 1100, check box controls under Synchronize with Site (item 1120) are provided for the user to select the type of items desired to synchronize with the commerce system site. The default is to have the Active Listings and Unsold listings checkboxes checked. The date range drop down menu 1110 allows the user to select the desired date range to retrieve listings. In the example shown, the selected "last 30 days" may indicate that the user wants to include in the synchronization process the listing data (e.g., active listing, sold, or unsold listings as shown under 1120) created within last 30 days.

Transaction synchronization from the client system 910 to the commerce system 920 (e.g., synchronizing revised listings in the client system 910 to the listings listed on the site) may take place using three different methods. These methods may include: 1) Real time (synchronize now (e.g., as soon as change is made to the listing data); 2) Scheduled (e.g., automatically synchronize the changed listings every 2 hours); 3) On-demand (e.g., the user will let the system know when to synchronize).

Figure 12:
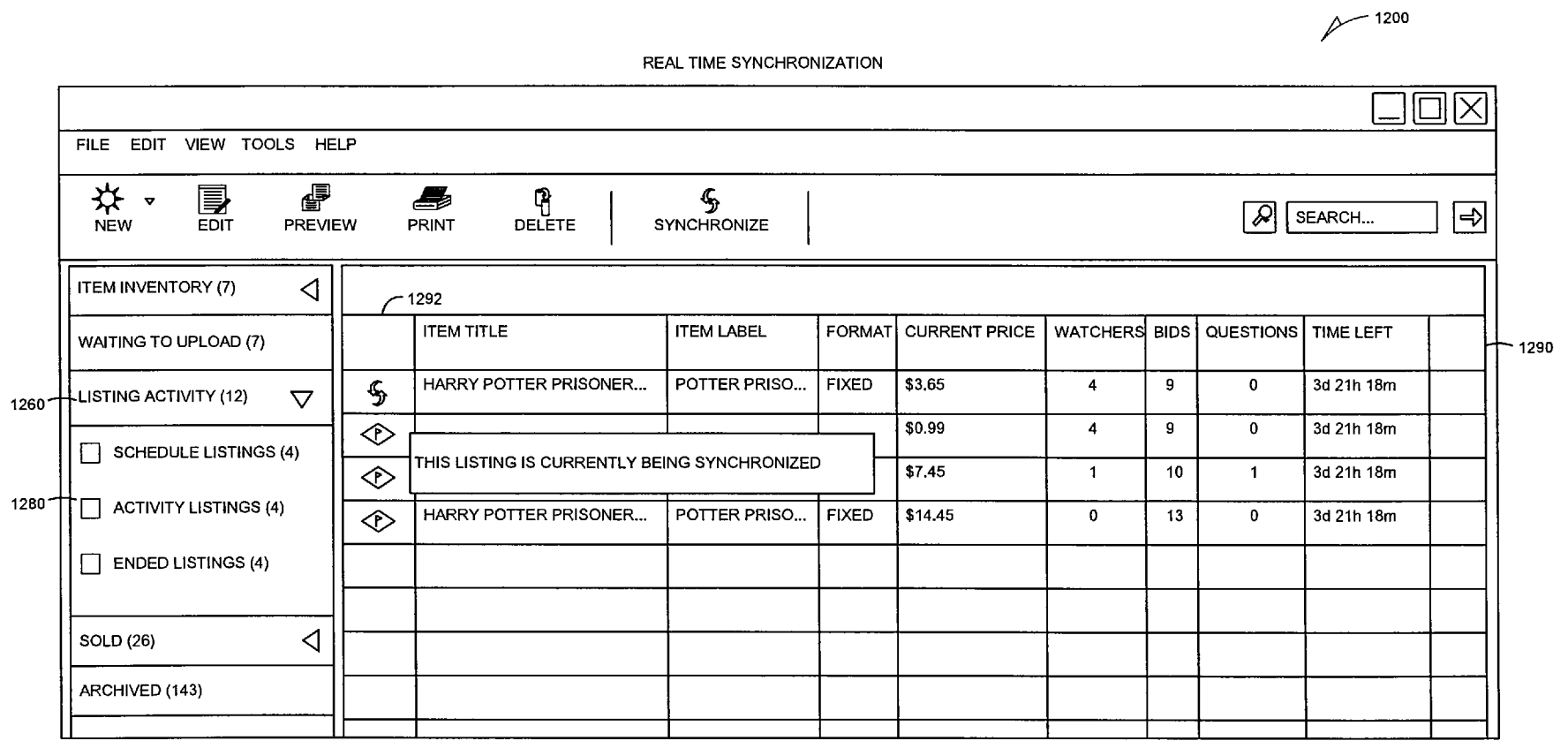

FIG. 12 is a screen shot, illustrating in an example embodiment, an active listings view 1200 of a client application window related to real time synchronization. The real time synchronization may occur at any time that the user edits a listing or sales records. To see the view 1200, the user may click on the Active Listing item 1280 under the Listing Activity knob 1260. In this view, a grid 1290 may show the Active Listing Attributes such as: Title, Label, Format, Price, etc. During the real time synchronization, in the status column

1292, an icon may appear next to the item currently synchronized. The icon contains the tooltip that reads "This listing is currently being synchronized".

FIG. 13 is a screen shot, illustrating in an example embodiment, an Active Listings view 1300 of a client application window related to scheduled synchronization. The scheduled synchronization batches all pending revisions and synchronizes them to the site upon the synchronization schedule specified by the user, in user's "Personal Information" shown on "Options and Preferences" dialog-box 1500 (see FIG. 15). To see the view 1300, the user may click on the Active Listing item 1280. In the status column an icon with letter "P" next to a listing may indicate that the listing is in a pending revision state. The icon has a mouse-over that shows a tooltip that reads "The listing has pending revisions". After the synchronization at the scheduled time, the icon will be removed FIG. 14 is a screen shot, illustrating in an example embodiment, a view 1400 of a synchronize toolbar of a client application window. On-Demand synchronization batches all pending revisions and synchronizes them to the site when the user decides to synchronize with the site. Before performing on-demand synchronization, the user has configured the client application 410 so that the synchronization occurs on demand. The user may open an "Active Listing" view 1300 and revise any of the listings under pending revision status, as desired, and press the synchronize button 1320 to synchronize the selected revised listings with the site. When the synchronization is performed, the icons may be removed from the status column 1410.

Figure 15:
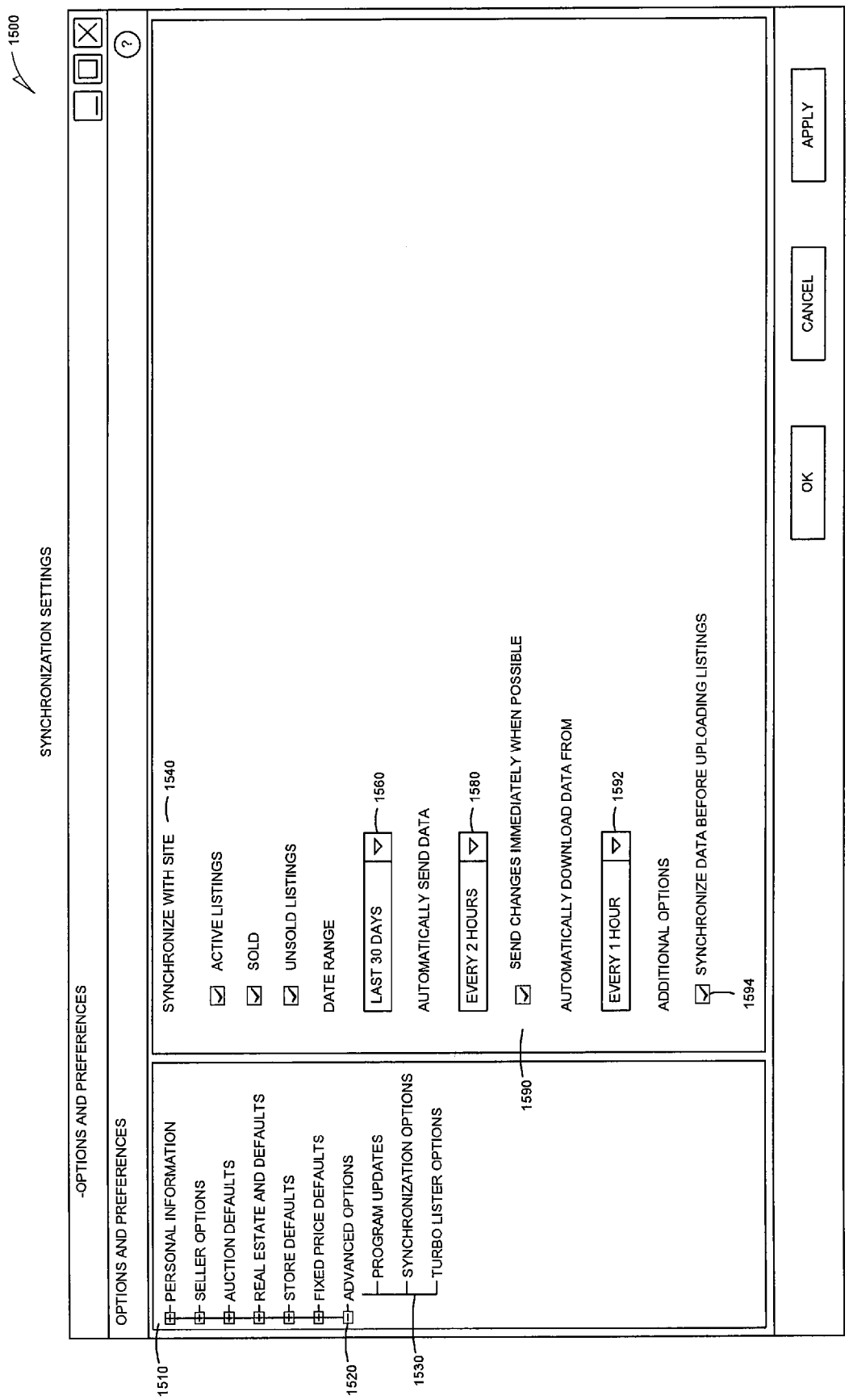
FIG. 15 is a screen shot illustrating in an example view of an options and preferences dialog-box.

FIG. 15 is a screen shot, illustrating in an example embodiment, a view 1500 of an "Options and Preferences" dialog-box. The user may click the "Synchronization Options" selection 1530 from the "Advanced Options" item 1520 of the selection list window 1510. In the dialog box 1500, check box controls under "Synchronize with Site" (item 1540) are provided for the user to select the type of items desired to synchronize with the commerce system site. The default is to have the "Active Listings" and "Unsold listings" checkboxes checked.

The "Date Range" pull down window 1560 allows the user to select the desired date range to retrieve listings. In the example shown, the selected "last 30 days" may indicate that the user wants to include in the synchronization process the listing data (e.g., active listing, sold, or unsold listings as shown under 1120) created within last 30 days.

The "Automatically Send Data" pull down window 1580 allows the user to select the time intervals for the scheduled synchronization with the site. The dialog-box also provides for options on synchronization from the site to the client application. The "Automatically Download Data" pull down window 1592 allows the user to select the time intervals for the synchronization from the site to the client application. Another checkbox 1594 provides the user with an additional option to synchronize data before uploading listings.

Figure 16:
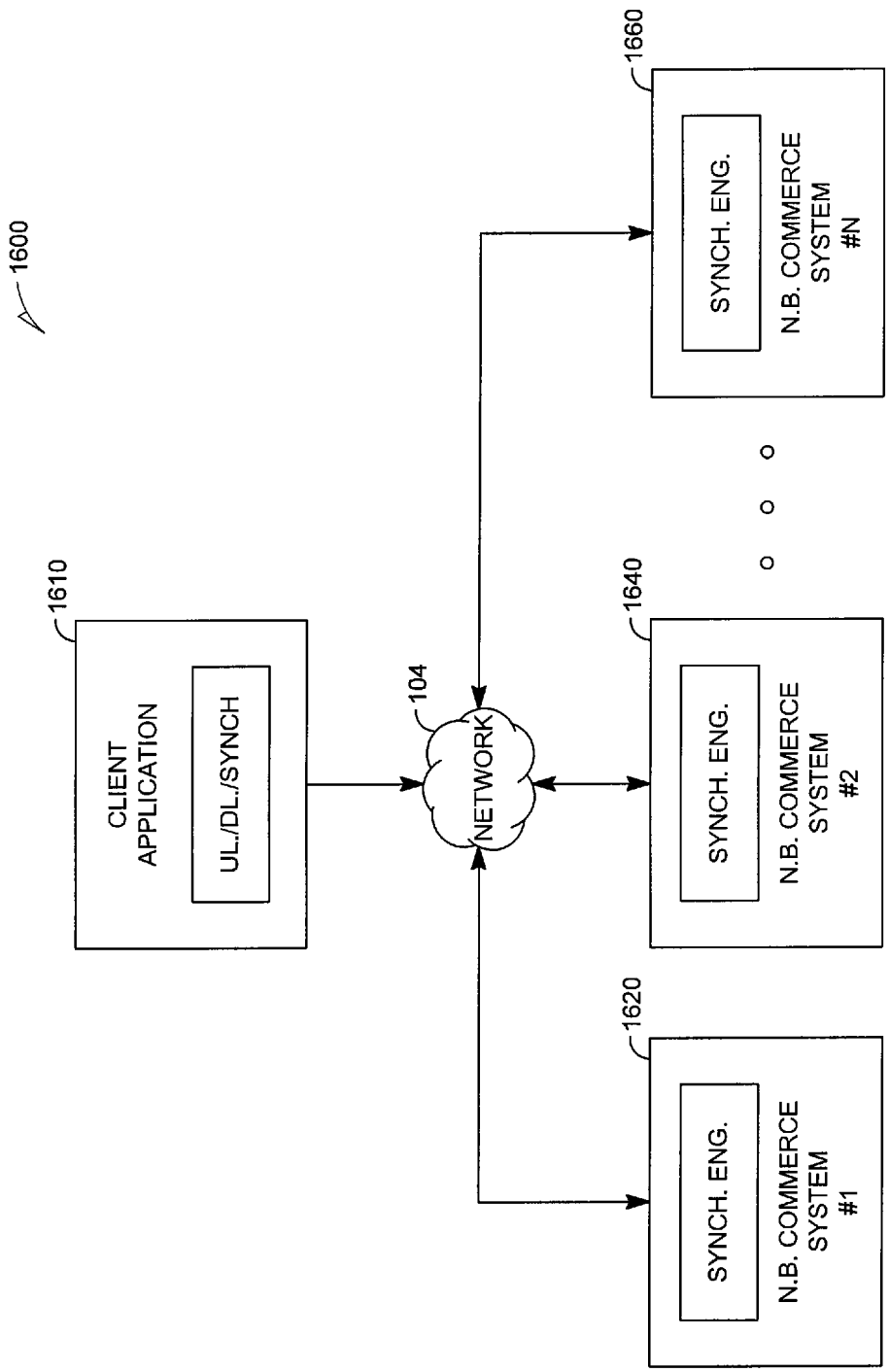
FIG. 16 is a block diagram illustrating an example embodiment of synchronization between a client and a plurality of commerce systems.

FIG. 16 is a block diagram illustrating an example embodiment of synchronization between a client and a plurality of commerce systems 1600. In this example embodiment, a client application 1610 may communicate (e.g., download updates from the sites or upload data to the sites), via the network 104 with a plurality of commerce systems (e.g., 1620, 1640, and 1660). The client application 1610 may synchronize itself to either of the commerce systems, or conversely, synchronize the commerce systems to the client application 1610. The synchronization of the commerce system to the client application 1610 may take place using any of the methods described above (e.g., Real time, Scheduled, or On-demand). The specifics of each method would be as previously described. It is appreciated that in the present case of multiple commerce system synchronization, the client application 1610 may provide the user with an option to specify to (from) which commerce system, the client application 1610 want to synchronize.

In an example embodiment a client application 1610 may have listings published in more than one commerce systems (e.g., 1620, 1640, and 1650). If an item form the listings is sold on one of the commerce systems, e.g. 1620, then the other systems (e.g., 1640 and 1650) have to synchronize with commerce system 1620 in updating their listings by withdrawing that item from the listings associated with the user.

In another example embodiment, when bidding on a listing in a commerce system 1620 reaches a specific level, that bidding may be propagated, by the synchronization process, throughout the entire commerce systems (e.g., 1640 and 1650) in which that listing was published.

Data Structures

Figure 17:
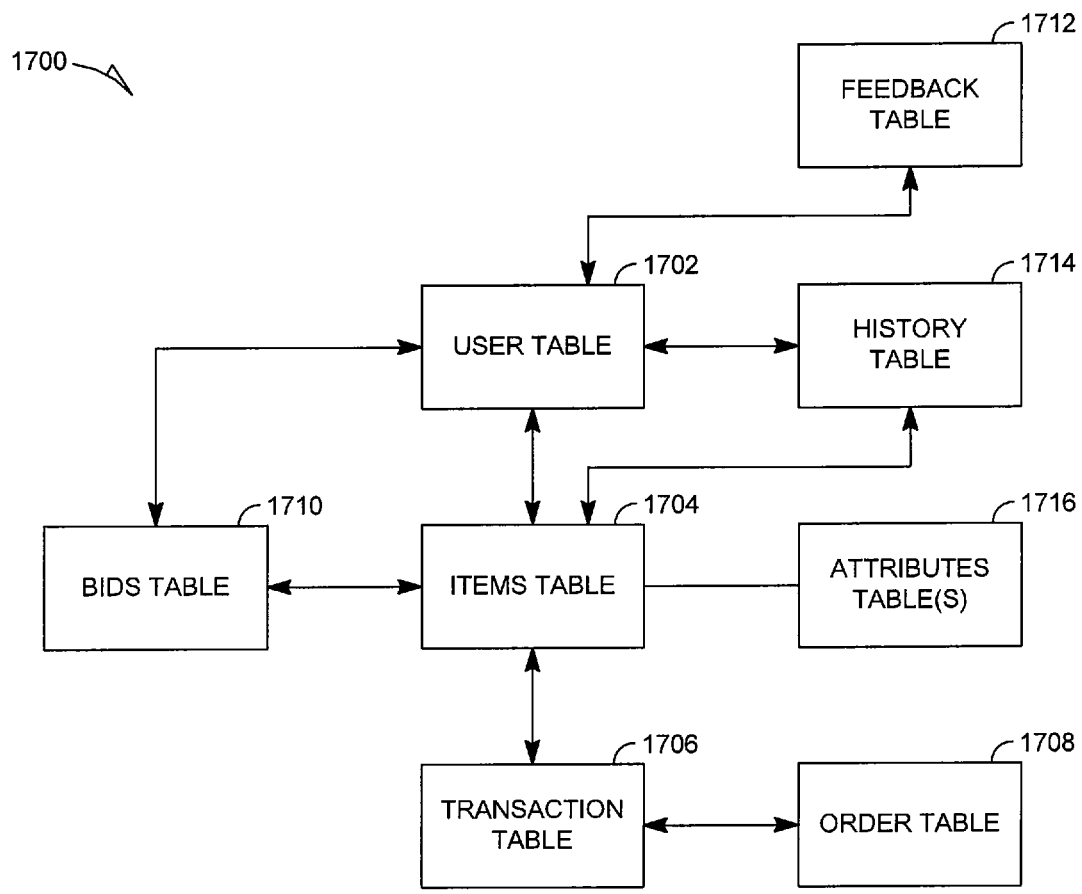
FIG. 17 is a high-level entity-relationship diagram illustrating various tables maintained within the databases.

FIG. 17 is a high-level entity-relationship diagram illustrating various tables 1700 that may be maintained within the databases 126 (see FIG. 1), and that are utilized by and support the applications 120 and 122 (see FIG. 1). A user table 1702 may contain a record for each registered user of the networked system 102 (see FIG. 1), and may include identifier, address and financial instrument information pertaining to each such registered user. A user may operate as a seller, a buyer, or both, within the networked system 102. In one example embodiment, a buyer may be a user that has accumulated value (e.g., commercial or proprietary currency), and is accordingly able to exchange the accumulated value for items that are offered for sale by the networked system 102.

The tables 1700 also may include an items table 1704 in which may be maintained item records for goods and services that are available to be, or have been, transacted via the networked system 102. Each item record within the items table 1704 may furthermore be linked to one or more user records within the user table 1702, so as to associate a seller and one or more actual or potential buyers with each item record.

A transaction table 1706 may contain a record for each transaction (e.g., a purchase or sale transaction) pertaining to items for which records exist within the items table 1704.

An order table 1708 may be populated with order records, each order record being associated with an order. Each order, in turn, may be with respect to one or more transactions for which records exist within the transaction table 1706.

Bid records within a bids table 1710 each may relate to a bid received at the networked system 102 in connection with an auction-format listing supported by an auction application 202 (see FIG. 2). A feedback table 1712 may be utilized by one or more reputation applications 208, in one example embodiment, to construct and maintain reputation information concerning users. A history table 1714 may maintain a history of transactions to which a user has been a party. One or more attributes tables 1716 may record attribute information pertaining to items for which records exist within the items table 1704. Considering only a single example of such an attribute, the attributes tables 1716 may indicate a currency attribute associated with a particular item, the currency attribute identifying the currency of a price for the relevant item as specified in by a seller.

Machine Architecture

Figure 18:
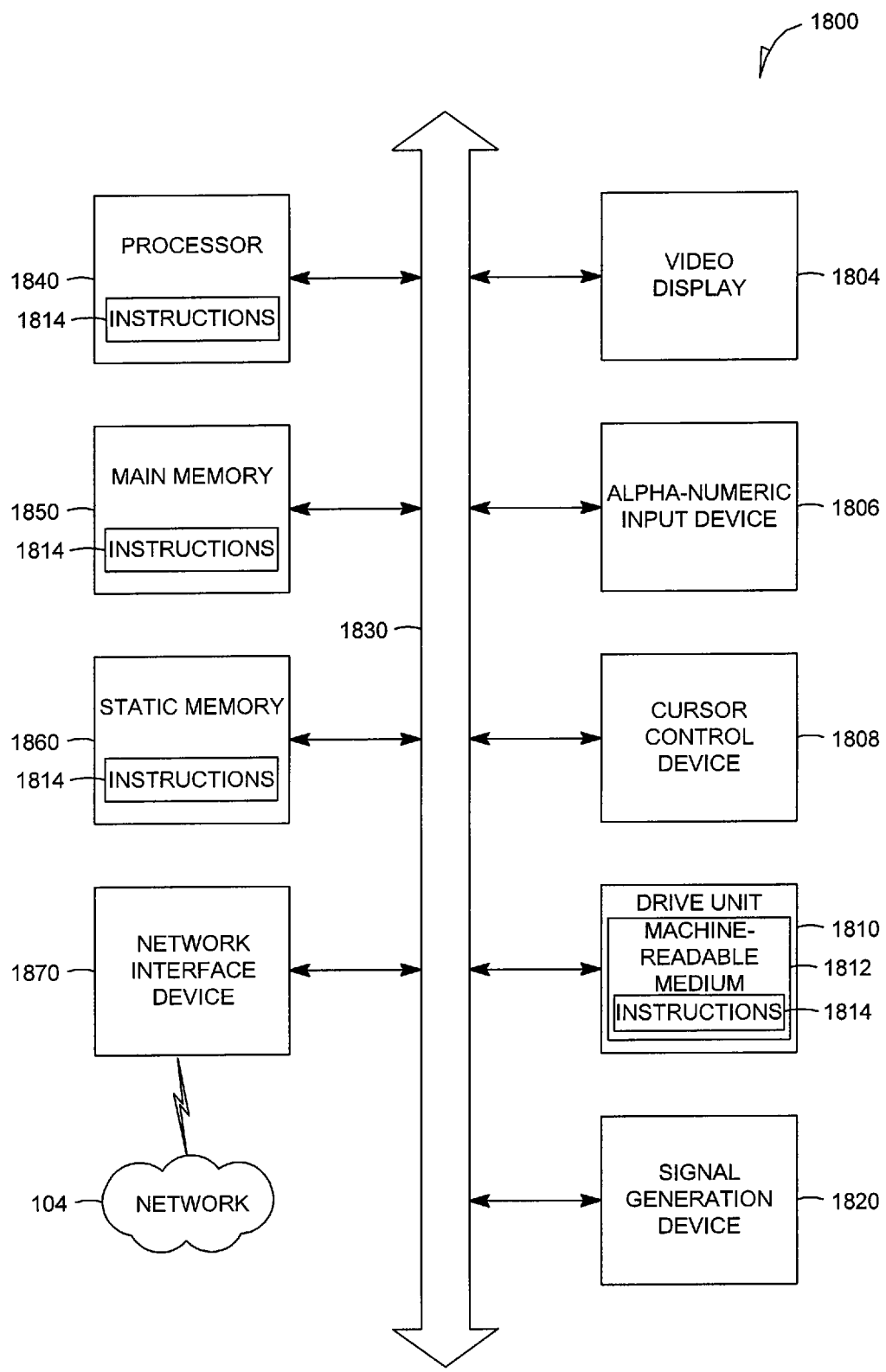
FIG. 18 is a block diagram illustrating a diagrammatic representation of a machine in the example form of a computer system.

FIG. 18 is a block diagram, illustrating a diagrammatic representation of machine 1800 in the example form of a computer system within which a set of instructions, for causing the machine to perform any one or more of the methodologies discussed herein, may be executed. In alternative embodiments, the machine may operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1800 may include a processor 1840 (e.g., a central processing unit (CPU) a graphics processing unit (GPU) or both), a main memory 1850 and a static memory 1860, which communicate with each other via a bus 1830. The computer system 1800 may further include a video display unit 1804 (e.g., liquid crystal displays (LCD) or cathode ray tube (CRT)). The computer system 1800 also may include an alphanumeric input device 1806 (e.g., a keyboard), a cursor control device 1808 (e.g., a mouse), a disk drive unit 1810, a signal generation device 1820 (e.g., a speaker) and a network interface device 1870.

The disk drive unit 1810 may include a machine-readable medium 1812 on which is stored one or more sets of instructions (e.g., software 1814) embodying any one or more of the methodologies or functions described herein. The software 1814 may also reside, completely or at least partially, within the main memory 1850 and/or within the processor 1840 during execution thereof by the computer system 1800, the main memory 1850 and the processor 1840 also constituting machine-readable media.

The software 1814 may further be transmitted or received over a network 426 via the network interface device 1870.

While the machine-readable medium 1812 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories and optical and magnetic media.

Thus, a method and system to synchronize the data between a commerce system and a client application or between a client application and multiple commerce systems have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims.

In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   at a network-based commerce system,
   opening a number of network connections, the number of the network connections determined by a client application locally installed on a client machine based on a machine census of the client machine, the machine census including determining a central processing power, total memory, available memory, bandwidth, and operating system, and a records census, the records census based on a number of items to synchronize between the network-based commerce system and the client application;
   receiving, via the network connections and from a user at the client application, first update data related to a user listing of the user;
   receiving, via the network connections and from the client application, a synchronization command that synchronizes updating of data related to the user listing of the user, between the client application and the network-based commerce system;
   responsive to the receiving of the synchronization command, updating a first record related to the user listing, the updating to include the first update data received from the user in the first record; and
   communicating, via the network connections, second update data to the client application, the second update data reflecting a further update to the first record related to the user listing.

2. The method of claim 1, including:
   receiving, at the client application, the second update data; and
   updating a second record related to the user listing using the second update data received from the networked-based commerce system.

3. The method of claim 1, wherein the first update data includes a description of the user listing.

4. The method of claim 1, wherein the first update data includes a modification of the description included in the user listing.

5. The method of claim 1, wherein the first update data indicates a removal of the user listing, and wherein the updating includes removing the user listing from publication by the network-based commerce system.

6. The method of claim 1, wherein the user listing is a fixed price listing.

7. The method of claim 1, wherein the user listing is an auction listing.

8. The method of claim 1, wherein the updating is performed in real-time by the network-based commerce system upon receiving the first update data from the client application.

9. The method of claim 1, wherein the updating is performed at a time scheduled by the client application.

10. The method of claim 1, wherein the seem ate data includes data related to a sale of an offering that is the subject of the user listing.

11. The method of claim 1 wherein the second update data includes data related to a current hid related to the user listing.

12. The method of claim 1, wherein the second update data includes data related to a message communicated by the client application.

13. A network based commerce system comprising:
one or more modules, each module comprising machine-executable instructions retained on non-transitory machine-readable media, the modules comprising,
a communication module to:
open a number of network connections, the number of the network connections determined by a client application locally installed on a client machine based on a machine census of the client machine, the machine census including determining a central processing power, total memory, available memory, bandwidth, and operating system, and a records census, the records census based on a number of items to synchronize between a network-based commerce system and a client application locally installed on a client machine; and
receive, from a user at the client application, a synchronization command that synchronizes updating of data related to the user listing of the user, between the client application and the network-based commerce system;
the communication module further configured to receive first update data related to a user listing of a user; and
a listing management module configured to update, responsive to the receiving of the synchronization command, a first record related to the use listing, the updating to include the first update data received from the user in the first record;
the communication module to communicate, via the network connections, second update data to the client application, the second update data reflecting a further update to the first record related to the user.

14. The system of claim 13, wherein he communication module is an Application Programming interface (API) server.

15. The system of claim 13, further comprising a synchronization module configured to control the timing of updates performed by the listing management module.

16. The system of claim 13, wherein the listing management module is configured to update the first record in real-tine upon receiving the first update data frorn the client application.

17. The system of claim 13, wherein the listing management module is configured to update the first record at a time scheduled by the client application.

18. The system of claim 13, wherein the listing management module is configured to update the first record including removing the user listing from publication by the network-based commerce system.

19. The system of claim 13, wherein the listing management module is configured to update the first record including modifying the description included in the user listing, received from the client application.

20. A method comprising;
at a client application locally installed on a client machine and configured to create and update a user listing by a user,
determining a machine census of the client machine, the machine census including determining a central processing power, total memory, available memory, bandwidth, and operating system, and a records census, the records census based on a number of items to synchronize between a network-based commerce system and a client application locally installed on a client machine;
opening a number of network connections, the number of network connections determined by the client application based on the machine census of the client machine and the record census;
transmitting, via the network connections, to the network-based commerce system a synchronization command that synchronizes updating of data related to the user listing of the user, between the client application and the network-based commerce system;
transmitting, via the network connections, first update data received from the user at the client application, to a network-based commerce system, the network-based commerce system to, responsive to receiving the synchronization command, update a record related to the user listing, the updating to include the first update data received from the user in the record;
receiving, via the network connections, second update data, pertaining, to the listing, from the network-based commerce system; and
updating, a record pertaining to the listing maintained at the client application, the updating to include in the record the second update data received from the network-based commerce system.

21. The method of claim 20, wherein the first update data includes a modification of the description included in the user listing.

22. The method of claim 20, wherein the first update data indicates a removal of the user listing, and wherein the updating includes removing the user listing from publication by the network-based commerce system.

23. The method of claim 20, wherein the second update data includes data related to a sale of an offering that is the subject of the user listing.

24. The method of claim 20, wherein the second update data includes data related to a current bid related to the user listing.

25. A client system comprising:
one or more modules, each module comprising machine-executable instructions retained on non-transitory machine-readable media, the modules comprising,
a synchronization engine to determine a machine census of a client machine and a records census and open a number of network connections, the number of network connections determined by a client application locally installed on the client machine based on a machine census of the client machine, the machine census including determining a central processing power, total memory, available memory, bandwidth, and operating system, and a records census, the records census based on a number of items to synchronize between a network-based commerce system and the client
a communication module configured to transmit, via the network connections and from the client application to a network-based commerce system, a synchronization command that synchronizes updating of data related to the user listing of a user, between the client application and the network-based commerce system;
the communication module configured to transmit first update data received from the user at the client application, to the network-based commerce system, the network-based commerce system to update a record related to the user listing, the updating to include the first update data received from the user in the record, and to receive, via the network, second update data, pertaining to the listing, from the network-based commerce system; and a listing manager configured to update, a record for the listing maintained at the client application, using the second update data received from the network-based commerce system.

26. The client system of claim 25, further comprising an upload module configured to deliver the first update data to the communication module.

27. The client system of claim 26, further comprising a user interface configured to communicate with a user.

28. The client system of claim 27, further comprising a synchronization engine configured to control the communication module, the upload module, and the listing manager, using input data received from the user interface.

\* \* \* \* \*

UNITED STATES PATENT AND TRADEMARK OFFICE
CERTIFICATE OF CORRECTION

PATENT NO.        : 8,799,218 B2                                        Page 1 of 1
APPLICATION NO.   : 11/566117
DATED             : August 5, 2014
INVENTOR(S)       : Liu et al.

It is certified that error appears in the above-identified patent and that said Letters Patent is hereby corrected as shown below:

In the Claims

Column 17, line 1, Claim 10, delete "seem ate" and insert --second update--, therefor Column 17, line 4, Claim 11, delete "1" and insert --1,--, therefor Column 17, line 5, Claim 11, delete "hid" and insert --bid--, therefor Column 17, line 9, Claim 13, delete "network based" and insert --network-based--, therefor Column 17, line 36, Claim 13, delete "use" and insert --user--, therefor Column 17, line 43, Claim 14, delete "he" and insert --the--, therefor Column 17, line 44, Claim 14, delete "interface" and insert --Interface--, therefor Column 17, line 51, Claim 16, delete "tine" and insert --time--, therefor Column 17, line 51, Claim 16, delete "frorn" and insert --from--, therefor Column 17, line 64, Claim 20, delete "comprising;" and insert --comprising:--, therefor Column 18, line 26, Claim 20, delete "pertaining," and insert --pertaining--, therefor Column 18, line 60, Claim 25, after "client", insert --;--, therefor Signed and Sealed this
Second Day of December, 2014

Michelle K. Lee
*Deputy Director of the United States Patent and Trademark Office*